(12) United States Patent
Govrin et al.

(10) Patent No.: US 12,524,872 B2
(45) Date of Patent: Jan. 13, 2026

(54) MONITORING A MECHANISM OR A COMPONENT THEREOF

(71) Applicant: ODYSIGHT.AI LTD, Omer (IL)

(72) Inventors: Amir Govrin, Ramat Gan (IL); Yekaterina Dlugach, Mabuim (IL); Arik Priel, Givat Shmuel (IL); Yael Finkelshtein Bakal, Meitar (IL); Gilad Senderovich, Petach Tikva (IL); Yishaia Zabary, Tel Aviv (IL)

(73) Assignee: ODYSIGHT.AI LTD, Omer (IL)

( * ) Notice: Subject to any disclaimer, the term of this patent is extended or adjusted under 35 U.S.C. 154(b) by 0 days.

(21) Appl. No.: 19/032,358

(22) Filed: Jan. 20, 2025

(65) Prior Publication Data
US 2025/0166169 A1 May 22, 2025

Related U.S. Application Data

(63) Continuation of application No. 18/860,455, filed as application No. PCT/IL2023/050428 on Apr. 25, 2023.
(Continued)

(51) Int. Cl.
*G06T 7/00* (2017.01)
*B64D 45/00* (2006.01)
(Continued)

(52) U.S. Cl.
CPC .......... *G06T 7/001* (2013.01); *B64D 45/0005* (2013.01); *G06T 7/0002* (2013.01);
(Continued)

(58) Field of Classification Search
None
See application file for complete search history.

(56) References Cited

U.S. PATENT DOCUMENTS

| | | | |
|---|---|---|---|
| 5,210,704 | A | 5/1993 | Husseiny |
| 5,233,293 | A | 8/1993 | Huang et al. |

(Continued)

FOREIGN PATENT DOCUMENTS

| | | |
|---|---|---|
| CN | 107436263 A | 12/2017 |
| CN | 111977025 A | 11/2020 |

(Continued)

OTHER PUBLICATIONS

Edgar A. Ossa, Marco Paniagua, Chapter 8—Suspension and landing gear failures, Editor(s): Abdel Salam Hamdy Makhlouf, Mahmood Aliofkhazraei, Handbook of Materials Failure Analysis with Case Studies from the Aerospace and Automotive Industries, Butterworth-Heinemann, 2016, pp. 167-190, ISBN 9780128009505, https://doi.org/10.1016/B978-0-12-800950-5.00008-9. (https://www.sciencedirect.com/science/article/pii/B9780128009505000089).

(Continued)

*Primary Examiner* — Stephen R Koziol
(74) *Attorney, Agent, or Firm* — The Roy Gross Law Firm, LLC; Roy Gross

(57) ABSTRACT

A system for detecting a state of a mechanism includes processing circuitry. The mechanism includes multiple components, at least some of which are capable of moving relative to each other. At least one state is specified for the mechanism, based on the alignment of the mechanism components. The processing circuitry identifies, within image data of the mechanism, reference points on at least two of the components. Based on respective locations of the reference points, it determines whether the components of mechanism are in one of the specified alignments (i.e. states), and outputs an indicator.

22 Claims, 18 Drawing Sheets

Related U.S. Application Data

(60) Provisional application No. 63/335,322, filed on Apr. 27, 2022.

(51) Int. Cl.
*G06T 7/246* (2017.01)
*G07C 5/00* (2006.01)
*G07C 5/08* (2006.01)

(52) U.S. Cl.
CPC .............. *G06T 7/251* (2017.01); *G07C 5/006* (2013.01); *G07C 5/0816* (2013.01); *B64D 2045/008* (2013.01); *B64D 2045/0085* (2013.01); *G06T 2207/20081* (2013.01); *G06T 2207/20092* (2013.01); *G06T 2207/30241* (2013.01); *G06T 2207/30248* (2013.01)

(56) References Cited

U.S. PATENT DOCUMENTS

| | | |
|---|---|---|
| 5,732,147 A | 3/1998 | Tao |
| 5,973,770 A | 10/1999 | Carter et al. |
| 6,873,411 B2 | 3/2005 | Sebok et al. |
| 6,988,610 B2 | 1/2006 | Fromme et al. |
| 7,131,529 B2 | 11/2006 | Meade |
| 7,272,253 B2 | 9/2007 | Katsuta et al. |
| 7,385,694 B2 | 6/2008 | Kolp et al. |
| 7,434,986 B2 | 10/2008 | Ignatowicz |
| 7,609,874 B2 | 10/2009 | Eswara et al. |
| 7,702,435 B2 | 4/2010 | Pereira et al. |
| 7,783,433 B2 | 8/2010 | Gordon et al. |
| 7,880,885 B1 | 2/2011 | Stana et al. |
| 8,009,515 B2 | 8/2011 | Cecala et al. |
| 8,042,765 B1 * | 10/2011 | Nance ................ B64D 45/0005 244/100 R |
| 8,134,472 B2 | 3/2012 | Cutsforth |
| 8,335,601 B2 | 12/2012 | Sham et al. |
| 8,779,943 B2 * | 7/2014 | Wolcken ............. G01M 5/0091 382/152 |
| 8,842,874 B1 | 9/2014 | Alphenaar et al. |
| 8,982,207 B2 | 3/2015 | Jang |
| 9,196,031 B2 | 11/2015 | Hikida et al. |
| 9,285,296 B2 | 3/2016 | Georgeson et al. |
| 9,501,820 B2 | 11/2016 | Nissen et al. |
| 9,550,583 B2 | 1/2017 | Szeto |
| 9,651,464 B1 | 5/2017 | Salzbrenner et al. |
| 9,786,042 B2 | 10/2017 | Venkatesha et al. |
| 9,875,409 B2 | 1/2018 | Ohmura et al. |
| 9,898,815 B2 | 2/2018 | Yamamoto et al. |
| 9,921,132 B2 | 3/2018 | Nissen et al. |
| 10,373,301 B2 | 8/2019 | Chaudhry et al. |
| 10,438,341 B2 | 10/2019 | Torres et al. |
| 10,459,615 B2 | 10/2019 | Hay |
| 10,521,898 B2 | 12/2019 | Wang et al. |
| 10,650,511 B2 | 5/2020 | Jones et al. |
| 10,789,785 B2 | 9/2020 | Mylaraswamy et al. |
| 10,861,147 B2 | 12/2020 | Wang |
| 10,885,664 B1 | 1/2021 | Schmidt |
| 10,909,781 B2 | 2/2021 | Bharadwaj et al. |
| 11,043,046 B2 | 6/2021 | Jasper |
| 11,142,345 B2 | 10/2021 | Giroux et al. |
| 11,169,288 B1 | 11/2021 | Johnson et al. |
| 11,288,972 B2 | 3/2022 | Bristow et al. |
| 11,299,294 B2 | 4/2022 | Parker et al. |
| 11,341,410 B1 | 5/2022 | Johnson et al. |
| 11,498,668 B2 | 11/2022 | Moravek et al. |
| 11,526,390 B2 | 12/2022 | Mead et al. |
| 11,568,292 B2 | 1/2023 | Ledbetter et al. |
| 11,639,915 B2 | 5/2023 | Giurgiutiu et al. |
| 11,709,113 B2 | 7/2023 | Baskin et al. |
| 11,734,623 B2 | 8/2023 | Bristow et al. |
| 11,780,591 B2 | 10/2023 | Kim et al. |
| 11,780,610 B2 | 10/2023 | Dunning et al. |
| 11,794,926 B2 | 10/2023 | Chavez et al. |
| 11,926,436 B2 | 3/2024 | Beaven et al. |
| 12,055,055 B1 | 8/2024 | Goyette et al. |
| 12,073,566 B2 | 8/2024 | Pal et al. |
| 12,146,416 B2 | 11/2024 | Goyette et al. |
| 2002/0054694 A1 | 5/2002 | Vachtsevanos et al. |
| 2003/0021455 A1 | 1/2003 | Dixon et al. |
| 2004/0154887 A1 | 8/2004 | Nehl et al. |
| 2005/0075846 A1 | 4/2005 | Kim |
| 2005/0120795 A1 | 6/2005 | Nehl et al. |
| 2006/0241927 A1 | 10/2006 | Kadambe et al. |
| 2008/0199193 A1 | 8/2008 | Nakazato et al. |
| 2009/0146601 A1 | 6/2009 | Le |
| 2010/0161255 A1 | 6/2010 | Mian et al. |
| 2010/0246974 A1 | 9/2010 | Choi et al. |
| 2011/0060568 A1 | 3/2011 | Goldfine et al. |
| 2011/0102850 A1 | 5/2011 | Watanabe |
| 2011/0137613 A1 | 6/2011 | Sakaguchi |
| 2012/0041639 A1 | 2/2012 | Followell et al. |
| 2012/0179169 A1 | 7/2012 | Swarup-et al. |
| 2013/0010094 A1 | 1/2013 | Satish et al. |
| 2014/0046881 A1 | 2/2014 | Loesl et al. |
| 2015/0062328 A1 | 3/2015 | Lauffer et al. |
| 2015/0222495 A1 | 8/2015 | Mehta et al. |
| 2016/0018427 A1 | 1/2016 | Streibl et al. |
| 2016/0025756 A1 | 1/2016 | Pollack et al. |
| 2016/0123998 A1 | 5/2016 | Macintyre et al. |
| 2016/0217587 A1 | 7/2016 | Hay |
| 2016/0300341 A1 | 10/2016 | Hay et al. |
| 2017/0220718 A1 | 8/2017 | Freeman et al. |
| 2017/0284849 A1 | 10/2017 | Baba |
| 2017/0333941 A1 | 11/2017 | Park et al. |
| 2018/0276912 A1 | 9/2018 | Zhou |
| 2018/0341248 A1 | 11/2018 | Mehr et al. |
| 2018/0365530 A1 | 12/2018 | Kluckner et al. |
| 2019/0025813 A1 | 1/2019 | Cella et al. |
| 2019/0033263 A1 | 1/2019 | Giurgiutiu et al. |
| 2019/0033848 A1 | 1/2019 | Cella et al. |
| 2019/0121349 A1 | 4/2019 | Cella et al. |
| 2019/0137986 A1 | 5/2019 | Cella et al. |
| 2019/0236456 A1 | 8/2019 | Kim et al. |
| 2019/0339684 A1 | 11/2019 | Cella et al. |
| 2020/0057880 A1 | 2/2020 | Mizutani et al. |
| 2020/0073362 A1 | 3/2020 | Shapiro et al. |
| 2020/0103250 A1 | 4/2020 | Yashan et al. |
| 2020/0166909 A1 | 5/2020 | Noone et al. |
| 2020/0190959 A1 | 6/2020 | Gooneratne et al. |
| 2020/0191122 A1 | 6/2020 | Bartschat et al. |
| 2021/0053227 A1 | 2/2021 | Wartenberg et al. |
| 2021/0125428 A1 | 4/2021 | Tedesco et al. |
| 2021/0174486 A1 | 6/2021 | Chowhan |
| 2021/0383160 A1 | 12/2021 | Vander Neut et al. |
| 2021/0407121 A1 | 12/2021 | Shapiro et al. |
| 2022/0004179 A1 | 1/2022 | Badkoubeh |
| 2022/0024577 A1 | 1/2022 | Stamatovski |
| 2022/0122638 A1 | 4/2022 | Hay et al. |
| 2022/0137080 A1 | 5/2022 | Vansickler et al. |
| 2022/0138622 A1 | 5/2022 | Patel et al. |
| 2022/0210309 A1 | 6/2022 | Feingold et al. |
| 2022/0334573 A1 | 10/2022 | Negri et al. |
| 2022/0402008 A1 | 12/2022 | Li et al. |
| 2025/0265695 A1 | 8/2025 | Bronars et al. |

FOREIGN PATENT DOCUMENTS

| | | | |
|---|---|---|---|
| CN | 114604768 A | 6/2022 | |
| EP | 0526489 A1 | 2/1993 | |
| EP | 1475627 A2 | 11/2004 | |
| EP | 2529932 1 A1 | 12/2012 | |
| EP | 3326954 A1 | 5/2018 | |
| GB | 2576787 A * | 3/2020 | ............ G01M 1/127 |
| GB | 2587416 A * | 3/2021 | ............ G01S 17/88 |
| JP | 3236387 B2 * | 12/2001 | |
| WO | WO-2006053433 A1 * | 5/2006 | ................ B64F 5/60 |
| WO | WO-2016011099 A1 * | 1/2016 | ............ G01S 7/497 |
| WO | 2022162663 A1 | 8/2022 | |
| WO | 2023209717 A1 | 11/2023 | |
| WO | 2024028852 A1 | 2/2024 | |
| WO | 2024028867 A1 | 2/2024 | |
| WO | 2024028868 A1 | 2/2024 | |
| WO | 2024028869 A1 | 2/2024 | |

(56) References Cited

FOREIGN PATENT DOCUMENTS

OTHER PUBLICATIONS

Govrin et al. (2022). U.S. Appl. No. 63/394,150, filed Aug. 1, 2022, 98pp.
Govrin et al. (2023). U.S. Appl. No. 63/521,140, filed Jun. 15, 2023, 78pp.
Govrin et al. (2022). U.S. Appl. No. 63/394,138, filed Aug. 1, 2022, 69pp.
P. Tchakoua, R. Wamkeue, A. Tameghe and G. Ekemb, "A review of concepts and methods for wind turbines condition monitoring," 2013 World Congress on Computer and Information Technology (WCCIT), Sousse, Tunisia, 2013, pp. 1-9, doi: 10.1109/WCCIT. 2013.6618706. (Year: 2013).
W. Jin et al., "Development and evaluation of health monitoring techniques for railway point machines," 2015 IEEE Conference on Prognostics and Health Management (PHM), Austin, TX, USA, 2015, pp. 1-11, doi: 10.1109ICPHM.2015.7245016. (Year: 2015).
W. Qiao and D. Lu, "A Survey on Wind Turbine Condition Monitoring and Fault Diagnosis—Part II: Signals and Signal Processing Methods," in IEEE Transactions on Industrial Electronics, vol. 62, .No. 10, pp. 6546-6557, Oct. 2015, doi: 10.1109/TIE.2015. 2422394 . (Year: 2015).
F. Claveau, S. Lord, D. Gingras and P. Fortier, "Mechanical Vibration Analysis Using an Optical Sensor," IEEE Seventh SP Workshop on Statistical Signal and Array Processing, Quebec City, QC, Canada, 1994, pp. 429-432, doi: 10.1109/SSAP .1994.572534. (Year: 1994).
Vanraj et al."Intelligent predictive maintenance of dynamic systems using condition monitoring and signal processing techniques—A review," 2016 International Conference on Advances in Computing, Communication, & Automation (ICACCA) (Spring), Dehradun, India, 2016, pp. 1-6 (Year: 2016).
Au, Joy et al. : "Challenges and Opportunities of Computer Vision Applications in Aircraft Landing Gear", 2022 IEEE Aerospace Conference (AERO), IEEE,Mar. 5, 2022, pp. 1-10. doi: 10.1109/ AERO53065.2022.9843684.
Zhang, Mengchao et al: "A Computer Vision Based Conveyor Deviation Detection System", Applied Sciences, vol. 10, No. 7, Apr. 1, 2020 (Apr. 1, 2020), pp. 1-10. https://doi.org/10.3390/ app10072402.

\* cited by examiner

MONITORING A MECHANISM OR A COMPONENT THEREOF

CROSS REFERENCE TO RELATED APPLICATIONS

This application is a Continuation of U.S. patent application Ser. No. 18/860,455, filed Oct. 25, 2024, which is a National Phase of PCT Patent Application No. PCT/IL2023/050428 having International filing date of Apr. 25, 2023, which claims the benefit of priority of U.S. Provisional Patent Application No. 63/335,322, filed Apr. 27, 2022, the contents of which are all incorporated herein by reference in their entirety.

TECHNICAL FIELD

The present disclosure relates generally to monitoring the condition and function of mechanisms and/or a component thereof as well as predictive based maintenance thereof.

BACKGROUND

Machine maintenance may include any work that maintains the mechanical assets running with minimal downtime to the machine and/or the component. Machine maintenance can include regularly scheduled service, routine checks, and both scheduled and emergency repairs. Maintenance may also include replacement or realignment of parts that are worn, damaged, or misaligned. Machine maintenance can be done either in advance of failure or after failure occurs. Machine maintenance is critical at any plant or facility that uses mechanical assets. It helps organizations meet production schedules, minimize costly downtime, and lower the risk of workplace accidents and injuries.

Today, industrial maintenance functions automatically over a set period of time (periodic maintenance) based on statistical and/or historic data, based on a certain level of use (for example mileage or a number of engine hours), or when a machine, part or component fails (breakdown maintenance). This type of maintenance is often wasteful and inefficient.

Landing gear is a complex subsystem of an aircraft (for example, unmanned aerial vehicles (UAVs)), or spacecraft (manned or unmanned), which is located undercarriage and is used for takeoff or landing. Landing gear is extremely vulnerable to damage due to its complex moving parts, and due to corrosion, cracks, wear, tire problems and other factors.

Although landing gear undergoes routine maintenance, failure of landing gears in aircraft represents approximately a 10% of the total of failures reported for the aerospace industry.

Additional background art includes Edgar A. Ossa et al. "*Handbook of Materials Failure Analysis with Case Studies from the Aerospace and Automotive Industries*", 2016, Pages 167-190, Chapter 8—Suspension and landing gear failures.

SUMMARY OF THE INVENTION

According to some embodiments there is provided a system, a method and a computer program product for detecting the state of components of a mechanical mechanism. According to some embodiments there is provided a system, a method and a computer program product for monitoring the health and/or the functioning and/or the potential for failure of a mechanical mechanism and/or a component thereof. According to some embodiments there is provided a system and method for monitoring the health and/or the functioning and/or the potential for failure of a mechanism or a component thereof. According to some embodiments there is provided a system and method for predictive based maintenance of a mechanism.

There is a particular difficulty in analyzing a mechanism, such as landing gear, that contains a number of joints (e.g., hinges, sliders, linear and rotary actuators, etc.) and components moving in complex motion.

Detecting the State of a Mechanism and Monitoring the Health of a Mechanism

In accordance with some embodiments of the invention there is provided a system and method for detecting the state of a mechanism which includes multiple components. At least two of the components are capable of moving relative to each other. The mechanism has at least one state, where each state is defined by a respective specified alignment of the mechanism components.

According to some embodiments, the system detects whether the mechanism is in a defined state using reference points that are identifiable in images taken of the components. Optionally, each component whose relative position is necessary to detect the mechanism state has at least one reference point. The system and method determine when the reference points are arranged in relation to each other in a way that conforms to a defined state and output an indicator of the state of the mechanism. When the reference points do not align in a way that conforms to a defined state, the indicator shows that the mechanism is not in a defined state.

The images are collected by one or more optical sensors, such as cameras. The optical sensors are located in positions where they have adequate field of view to obtain images for all the reference points that are necessary to detect whether the mechanism components are aligned in accordance with a defined state and/or to evaluate the health of the mechanism. Optionally, a single optical sensor has a field of view that includes more than one of the required reference points. Alternately or additionally, the required reference points are imaged by more than one optical sensor, where the respective field of view of each optical sensor may include one or more of the reference points.

In some embodiments, multiple images which include the same reference point are taken over time. The motion of a component may thus be tracked by following the movement of the reference point(s) within the sequence of images. The sequence of images may, for example, be a video or a sequence of still images.

Some, all or none of the optical sensors may be part of the system.

Optionally, the system includes one or more of the optical sensors.

The alignment of reference points that conforms to a defined state may be specified by any means known in the art. Examples include but are not limited to a table lookup, arithmetic computation of distance vectors, algorithms and machine learning modeling of the mechanism components based on the reference points.

In some embodiments, the indicator of the state of the mechanism provides additional information about the state of the mechanism. For example, when the mechanism has multiple defined states, the indicator may include information about which defined state it is in. In another example, when the mechanism is not in a defined state the indicator may include information about how far from alignment the reference points are, which may be classified as intermediate states of the mechanism.

Many mechanisms include a locking component, such as a latch or spring or any other component that is designed to prevent the mechanism from moving out of the state. Such a component ensures that the mechanism stays locked until an action is taken such as disengaging the latch or the mechanism is positioned in a way that allows movement. Optionally, the system and method detect whether the mechanism is in a locked state, meaning the mechanism is in a defined state and a locking mechanism is engaged. In a locked state at least some of the components are essentially static (though there might be small motions such as vibrations). Optionally, the mechanism has more than one locked state.

Optionally, detecting whether the mechanism is in a locked state includes determining from the image data whether the locking mechanism is engaged.

The mechanism is considered stateless when the components are not aligned in a way that is defined as a state. It is noted that when the mechanism is unlocked the mechanism components may be moving or stationary.

For example, consider a gate with an arm that is defined as being in a locked state both when it is horizontal and when it is vertical. When the arm is horizontal the path is closed, and when the arm is vertical the path is open. However, if the arm is moving between open and closed positions or is stuck between opened and closed positions the gate is considered to be in an unlocked state.

In accordance with alternate or additional embodiments of the invention, image data and reference points identifiable within the image data may be used to monitor the health of a mechanism. During operation, the location and/or velocity and/or acceleration of the reference points in a sequence of images may be tracked for multiple components. The relative motions of the reference points are processed by a model of the proper operation of the mechanism. If the relative motions conform to the model, the mechanism is operating properly, within permitted tolerances. Relative motions of the reference points that are not in accordance with the requirements of the model may be a sign of failure and/or excessive wear and tear on the mechanism and/or a need for maintenance.

The images may also be analyzed to obtain additional information for monitoring the mechanism health.

One parameter that may provide information for trend analysis of mechanism health is the time it takes a component to move from one position to a second position. A longer time may indicate increased friction, for example due to rust or corrosion. Alternately, a shorter time may indicate greater slippage due to thinning or warping of a component over time.

Another example of a parameter that may assist in determining mechanism health is the relative timing of the motions of the mechanism components. A loss of synchronization in the motion of different mechanism components may indicate the need for maintenance or replacement.

In some embodiments, the images are analyzed to determine the health of a single component of the mechanism, such as, for example, the loosening or rotation of a screw, rust or corrosion formation, tension of an elastic element, leaks, crack and/or other wear of components. Optionally, the indicator includes information about defects and/or potential faults in the single component.

Optionally, the health of the mechanism is assessed by a joint analysis of the relative motions of multiple mechanism components, along with additional information for single components. For example, the analysis may check the health of components such as screws and hinges when a change in the time it takes the mechanism to move from one state is detected.

Information about the health of a mechanism and/or components of the mechanism is extremely significant in fields such as Prognostic Health Management (PHM), Condition-based Maintenance (CBM) and Health & Usage Monitoring Systems (HUMS).

In some embodiments the mechanism is subsystem of a vehicle. The optical sensors may be installed in the vehicle. Thus the relative positions of the optical sensors and the mechanism components does not change significantly while the vehicle is in motion.

In some embodiments the optical sensor and its corresponding components (such as printed circuit board and light source) is very small, so that the size, weight and volume of the optical sensor(s) installed in the vehicle do not interfere with vehicle operation.

The optical sensors may be the same size or have varying sizes. Optionally, the diameter of the optical sensors is in the range of 0.5-10 mm, such as 0.65-3 mm or 0.65-5 mm.

Optionally, the optical sensor and corresponding PCB and/or light source are shielded so as to prevent interferences from and to the operation of the optical sensor by the machine or vehicle operation.

In further embodiments the subsystem is configured to support the body of the vehicle at least during one of the specified states.

In one example, the mechanism is the landing gear of an aircraft or a spacecraft. The landing gear supports the aircraft body while the aircraft is on the ground.

In a second example, the subsystem is the suspension system of a motor vehicle such as a car or truck. The suspension system includes elements such as tires, shock absorber, linkages, axles and other components that provide support between the vehicle chassis and the ground.

As used herein, according to some embodiments of the invention, the terms "mechanical mechanism" and "mechanism" mean a system of objects working together to perform a function. Optionally, the mechanism is part of a machine.

As used herein, according to some embodiments of the invention, the terms "component of the mechanism" and "component" mean one of the objects forming the mechanism.

As used herein, according to some embodiments of the invention, the term "image data" means data that is based on images captured by the optical sensors. The image data may include the images themselves and/or the data obtained by processing the images (for example to format the images into a data format suitable for the processing circuitry, to adjust contrast and/or brightness in the images, compensate for optical sensor vibration, etc.).

According to some embodiments of the invention, the image data includes images of the mechanism components. Optionally, the image data includes additional images (e.g. images of other mechanisms such as static or passive components, images of the surroundings the mechanism is operating in, images of a machine the mechanism is part of, etc.).

As used herein, according to some embodiments of the invention, the term "subsystem" means a self-contained system within a machine. Optionally, the self-contained system is operated by the operating system of the machine.

As used herein, according to some embodiments of the invention, the term "state" means a specified alignment of the mechanism components.

As used herein, according to some embodiments of the invention, the term "locked state" means that the mechanism is in one of the specified alignments and a locking mechanism is engaged.

As used herein, according to some embodiments of the invention, the term "unlocked" mean that the mechanism components are not in a locked state.

As used herein, according to some embodiments of the invention, the term "optical sensor" mean a device which senses an optical signal and outputs image data.

As used herein, according to some embodiments of the invention, the term "reference point" means an element on a component which may be detected by image processing and having a known location and/or orientation on the component. Optionally, the location and/or orientation is relative to other components of the machine.

According to some embodiments, the term "reference point" is not limiting to a specific size or shape of the reference point. For example, a reference point may be a circle, a line, an arrow, a rectangle or any other shape. It is noted that the reference point may indicate a direction in addition to its location (e.g. an arrow).

As used herein, according to some embodiments of the invention, the terms "relative motion" and "components capable of relative motion" are motions in a frame of reference established by the mechanism location and orientation (or by the location and orientation of a specific mechanism component). Thus, even though a component of the machine may be spatially stationary, other moving components in the mechanism may be in relative motion to the stationary component.

Typically, mechanisms transform input forces and the motions of some mechanism components into a desired output of forces and motions of other mechanism components. Mechanisms have a vast array of uses and are a part of almost every machine. Non-limiting examples of mechanisms include:
1) Actuators;
2) Linkages;
3) Brakes;
4) Gear trains;
5) Shafts;
6) Joints;
7) Cam and follower systems (e.g. belt and chain drives);
8) Cables;
9) Clutches; and
10) Springs.

The skilled professional will be familiar with many types of mechanisms and the functions they perform.

Examples of a reference point may include but are limited:
1) A marking made on the component (e.g. a sticker or paint);
2) A physical element, such as a screw or joint of the component;
3) An existing sign, such as a defect, natural line or border line of the component.

Effects of the invention may include but are not limited to:
1) Simple detection of the state of the mechanism during operation, for example whether the mechanism is in a locked state.
2) Ability to provide real-time indicators and/or alerts regarding the state and health of the mechanism.
3) Easy modeling of a properly functioning mechanism using images of mechanism components collected by the optical sensor(s). The model may be tailored to a specific mechanism using images of components of the specific mechanism. The model may additionally be based on other types of data such as general specifications, knowledge of operating conditions of the mechanism, etc.
4) The model may be retrained periodically based on images collected during actual operation of a generic and/or specific mechanism.
5) Simple assessment of the health of the mechanism from image data, optionally provided to PHM, CBM, HUMS systems. For example, providing indications of the health of components, such as but not limited to loosening or rotation of a screw or bolt, rust or corrosion formation, tension of an elastic element, leaks, lubrication, wear of components, etc.

Some or all of the above may be accomplished using image data provided by optical sensors positioned to collect images of reference points on mechanism components. Optionally, the results of the analysis of the image data are validated and/or refined using data from other types of sensors, such as acoustic sensors, vibration sensors or temperature sensors. For example, a change in the motion of a mechanism component along with a loud noise detected by an acoustic sensor may indicate a severe fault whereas a lower amplitude noise may indicate a less sever fault.

Monitoring the Integrity and/or Function of a Mechanism

In accordance with some embodiments of the invention there is provided a system for monitoring the integrity and/or function of a mechanism.

In some embodiments the mechanism is a subsystem of a vehicle. In further embodiments the subsystem is configured to support the body of the vehicle at least during the locked state. In yet further embodiments, the mechanism is the landing gear of an aircraft or a spacecraft.

According to some embodiments, a system to monitor the health of a mechanism includes at least one optical sensor, such as a camera, configured to be fixed on, in vicinity to, or in sight with a mechanism or a component thereof, and at least one processor in communication with the at least one optical sensor. The system may be configured to provide an indication of the integrity and/or well function of the mechanism or any component thereof. Alternatively or additionally, the system may be configured to provide an indication of potential failure in mechanism or a component thereof or in a function thereof. The system may further include a light source providing illumination of the mechanism. According to some embodiments, the system may be operable as a stand-alone system for monitoring the integrity and/or function of the mechanism. According to additional or alternative embodiments, the system may be operable as an additional or a back-up system for monitoring the integrity and/or function of the mechanism if and when other sensors (such as the presently used pressure sensors) are malfunctioning.

According to some embodiments, the systems disclosed herein may further include, in addition to one or more optical sensors (such as the cameras) other sensors, such as pressure sensors, temperature sensors, acoustic sensors, velocity sensors etc. a combination of sensors may result in a more accurate indication regarding the mechanism, for example, full lock.

According to some embodiments, the systems disclosed herein may include a plurality of sensors (e.g., a plurality of cameras or a combination of one or more cameras and other sensors) such that each of the plurality of sensors acquires data from each relevant area such as joint/moving component/element of moving component/marking (e.g., line) etc.

According to some embodiments, the one or more optical sensors (e.g., cameras) of the systems for monitoring mechanism disclosed herein, may have field of view enough to capture all relevant mechanism components (for example all moving elements).

According to some embodiments, the operator/technician may be allowed to select areas of interests of the mechanism (e.g., joints/moving elements/lines, etc.) in order to save computer resources and monitor the defined these segments only.

According to some embodiments, the processor is executable, based at least on signals received from the at least one optical sensor, to monitor a trajectory and/or speed of movement of reference points (for example, predetermined reference points) on the mechanism or components thereof. The integrity and function of the mechanism or components thereof, may be determined by the processor by comparing the monitored trajectory and/or speed of each of the reference points to pre-obtained (or pre-calculated) trajectory curve and/or speed of each of such reference points in a fully functional mechanism. For example, in accordance with some embodiments, if one (or more) of the reference points is deviating from a pre-determined trajectory curve a malfunction of a mechanism or component thereof may be determined. Additionally or alternatively, maintenance may be recommended. Additionally or alternatively, time until failure may be calculated and indicated.

According to some embodiments, the integrity and function of the mechanism or components thereof, may be determined in real time. According to some embodiments, the integrity and function of the mechanism or components thereof, may be determined in real time from a remote location.

According to some embodiments, the method for determining the integrity and proper function of a complex mechanism, such as a landing gear or components thereof, may include, utilizing at least one processor for:
   defining one or more reference points on moving parts of the mechanism or components thereof;
   for each reference point, assigning a correct/normal trajectory and/or a correct/normal speed,
   during operation of the complex mechanism, such as the mechanism or components thereof, monitoring a trajectory and/or a speed of each of the reference points,
   determining whether each of the monitored reference points moves along the respective assigned trajectory curve and/or moves at the assigned speed (or within margins/ranges defined for the assigned trajectory curve and/or speed of each reference point), and
   if the trajectory and/or speed of at least one of the reference points deviates from the respective assigned (correct/normal) trajectory curve and/or speed or (pre-determined) margins/ranges thereof:
   providing an indication of suspected malfunction/failure/damage/fault of the mechanism, and/or
   providing an indication of a predicted malfunction/failure/damage/fault of the mechanism.

According to some embodiments, the method may further include alerting a user of a suspected and/or predicted malfunction/failure/damage/fault of the mechanism or component thereof.

According to some embodiments, the assigned (correct/normal) trajectory curve and/or speed of the reference points may be determined using the one or more optical sensors (e.g., cameras) of the system.

According to some embodiments, the assigned (correct/normal) trajectory curve and/or speed of the reference points may be determined by analyzing multiple images/video clips of a complex system, such as a mechanism, and determining the "allowed" ranges/margins of trajectory curve and/or speed of each reference point that may still be defined as "normal".

According to some embodiments, the assigned (correct/normal) trajectory curves and/or speed of the reference points may be determined by analyzing multiple images/video clips/data obtained from failed mechanisms (e.g., failed mechanisms or components thereof) and obtaining trajectory curves and/or speed values that are typical to failure.

According to some embodiments, a rate of deviation of the reference points from their respective assigned (correct/normal) trajectory curves and/or speed may be determined and utilized to predict a timeline to failure.

According to some embodiments, there is further provided herein a system for determining a full down and locked position of the mechanism. The system includes at least one optical sensor, such as a camera, configured to be fixed on, in vicinity to, or in sight with a mechanism or a locking mechanism thereof and at least one processor in communication with the optical sensor. According to some embodiments, the processor is executable to receive signals from the at least one optical sensor (such as images from the camera), to detect at least two markings (real or virtual) on at least two moving parts of the locking mechanism and to determine a full locked position of the locking mechanism based on a relative position between the two markings. According to some embodiments, the markings may be a line, symbol, or any other sign such as but not limited to, arrow(s) triangles etc. The markings may be for example, two lines, and the relative position between the two lines indicative of full locked position of the locking mechanism may be parallel convergence of the two lines. According to some embodiments, the markings may be in a configuration of Nonius or vernier scale so facilitate calculation of the level of accuracy (angular and/or linear) of the locking indication. According to some embodiments, the processor may further be configured to provide an indication of full locking of the locking mechanism of the mechanism. According to some embodiments, the at least two markings may be existing signs, such as defects, natural lines, or border lines on machine/mechanism elements, that the algorithms applied by the system automatically identifies and chose, or that the operator choses, for example, through the technician's application.

According to some embodiments, the at least two markings may be stickers that are attached to different elements of moving parts of the mechanism.

Determining Locked Position and Detecting Hard Landings for a Landing Gear

According to some embodiments, the method for determining a full down and locked position of a landing gear. The method includes, utilizing at least one processor for:
   receiving signals from the at least one optical sensor (such as images from the camera),
   detecting at least two markings, e.g., lines, (real or virtual) on at least two moving parts of the locking mechanism, and determining a full locked position of the locking mechanism based on a relative position between the at least two markings, e.g., lines, for example, parallel convergence thereof.

The method may further be configured to provide an indication of full locking of the locking mechanism of the landing gear.

In aircraft, particularly in unmanned aerial vehicles (UAVs), an indication of touchdown and indication of "hard landing" may be of importance to the pilot or the remote operator.

There is thus provided herein, in accordance with additional or alternative embodiments, a system for monitoring/determining/predicting touchdown of a landing gear's wheels. The system includes at least one optical sensor, such as a camera, configured to be fixed on, in vicinity to, or in sight with a landing gear or wheels thereof and at least one processor in communication with the optical sensor. According to some embodiments the system for determining a full down and locked position of the landing gear may also be configured for the monitoring/determining/predicting touchdown of a landing gear's wheels.

According to some embodiments, the processor is executable to receive signals from the at least one optical sensor (such as images of one or more wheels from the camera), to measure the ground speed (for example, by measuring linear velocity of different objects and the angular velocity of one or more of the wheels, and, utilizing algorithmics, calculate the ground (linear) velocity of the one or more wheels and provide a touchdown indication when the ground (linear) velocity of the one or more wheels equals the ground speed.

According to some embodiments, one or more of the following options may be utilized for calculating the ground speed:

1. The system (e.g., the processor) knows the speed of the aircraft relative to the ground using other sensors/systems of the aircraft.
2. Given that the system knows approximately the height of the aircraft from the ground: by calculating the time when any element on the ground passes over a known number of pixels in the camera the ground speed can be calculated in relation to the speed of the aircraft.
3. Given that the size of the elements on the ground are known (e.g., stripes on the runway) the speed of the aircraft relative to the ground can be calculated by calculating the time that the ground component of the known size passes over a known number of pixels.

When the speed of the ground is known, it can be compared to the linear speed of the wheel. Since the position of the camera is fixed, its distance from the wheel is also known. As the wheel rotates, its angular velocity can be calculated by measuring the time at which a mark on the wheel passes over a known number of pixels. Given a known diameter of the wheel or measurement of the diameter by the camera, the linear velocity of the wheel can be calculated from its angular velocity.

According to additional or alternative embodiments, the processor is executable to receive signals from the at least one optical sensor (such as images of one or more wheels from the camera), to measure the distance between the ground and one or more of the wheels and provide a touchdown indication when the distance is zero (or when the distance is below a predetermined threshold).

According to additional or alternative embodiments, the processor is executable to receive signals from the at least one optical sensor (such as side images of one or more wheels from the camera), to measure a degree of flattening of one or more of the wheels and provide a touchdown indication when the height of a lower part of a tire of the one or more wheels is below a predetermined threshold (or less than the height of a upper part of the tire). Such "flattening" of the tire may be indicative of the weight of the aircraft applied on the wheels or in other words, indicative to touchdown.

There is further provided herein, in accordance with additional or alternative embodiments, a system for providing a "hard landing" indication. The processor of such system may be executable to receive signals from the at least one optical sensor (such as images of a damper of a landing gear from the camera), to measure a degree of depression of the damper and provide a "hard landing" indication when the degree of depression of the damper is above a predetermined threshold. The predetermined threshold may be calculated, for example, based on one or more standard deviation values from damper depression values in an average landing. According to some embodiments the system for determining a full down and locked position of the landing gear and/or for the monitoring/determining/predicting touchdown of a landing gear's wheels may also be configured for providing the "hard landing" indication.

According to some embodiments, the processor may be executable to receive signals from the at least one optical sensor, obtain data associated with characteristics of at least one mode of failure of the mechanism or the component thereof (for example, a trajectory and/or speed of reference points on moving part(s) of the monitored mechanism or component(s) thereof), and to identify at least one change in the received signals, for an identified change in the received signals (for example, a deviation from a trajectory and/or speed of the one or more reference points on moving part(s) of functional/intact mechanism or components thereof as pre-obtained or pre-calculated), Mode of Failure Identification According to some embodiments, the system monitors the health of additional components of the mechanism, in addition to or instead of the motion of the components. Optionally the processor is executable to apply the at least one identified change to an algorithm configured to analyze the identified change in the received signals and to classify whether the identified change in the received signals is associated with a mode of failure of the mechanism or the component thereof (optionally predefined), thereby labeling the identified change as a fault, based, at least in part, on the obtained data, and for an identified change that is classified as being associated with a mode of failure, outputting a signal indicative of the identified change associated with the mode of failure.

As used herein, according to some embodiments of the invention, the term "identified change" in received signals or images comprises a change in a received image with respect to a baseline and/or with respect to other images of the optical sensor or a same area or of similar components in other mechanisms.

According to some embodiments, for an identified fault, the processor may generate at least one model of a trend in the identified fault, wherein the trend may include a rate of change in the fault.

According to some embodiments, the system may be configured for smart maintenance of the mechanism or component thereof, by using one or more algorithms configured to detect a change, identify a fault, and determine whether the fault may develop into a failure of the mechanism and/or component. Optionally, the system comprises a suppressor which filters identified changes and/or faults that are not associated with a predefined mode of failure of the images components. For example, the suppressor may filter a fault which indicates a fly on the imaged components or dirt on the optical lens or imaged component, thereby reducing the number of false alarms.

Advantageously, the system and method may enable visualization of inaccessible areas which require high efforts to be examined/maintained, by positioning the one or more optical sensors, on, in vicinity to or in sight with the mechanism or components that may not be visually monitored otherwise.

Advantageously, the system and method may reduce the time and cost due to grounding of the machine (e.g., aircraft). Moreover, the system and method may minimize the cost of unnecessary maintenance, and the cost of unnecessary part replacement, which may be done automatically when a mechanism or a component thereof is replaced regularly due regular protocol maintenance of the mechanism.

Advantageously, the system may enable trend identification and calculation, thereby analyzing the trends in the fault development within the mechanism or component thereof, and thus enabling the prediction of failure even before there is a change in normal behavior or operation of the mechanism. According to some embodiments there is provided a system for monitoring potential failure in a mechanism or a component thereof, the system including: at least one optical sensor configured to be fixed on or in vicinity of the mechanism or the component thereof, at least one processor in communication with the optical sensor, the processor being executable to: receive signals from the at least one optical sensor, obtain data associated with characteristics of at least one mode of failure of the mechanism or the component thereof, identify at least one change in the received signals, for an identified change in the received signals, apply the at least one identified change to an algorithm configured to analyze the identified change in the received signals and to classify whether the identified change in the received signals is associated with a mode of failure of the mechanism or the component thereof, thereby labeling the identified change as a fault, based, at least in part, on the obtained data, and for an identified change is classified as being associated with a mode of failure, outputting a signal indicative of the identified change associated with the mode of failure.

According to some embodiments there is provided a computer implemented method for monitoring a mechanism or a component thereof, the method including: receiving signals from at least one optical sensor fixed on or in vicinity of the mechanism or the component thereof, obtaining data associated with characteristics of at least one mode of failure of the mechanism or the component thereof, identifying at least one change in the received signals, for an identified change in the received signals, applying the at least one identified change to an algorithm configured to analyze the identified change in the received signals and to classifying whether the identified change in the received signals is associated with a mode of failure of the mechanism or the component thereof based, at least in part, on the obtained data, and for an identified change is classified as being associated with a mode of failure, outputting a signal indicative of the identified change associated with the mode of failure.

According to some embodiments, for an identified fault, the method and/or system includes generating at least one model of a trend in the identified fault.

According to some embodiments, the trend includes a rate of change in the fault.

According to some embodiments, generating the at least one model of trend in the identified fault includes calculating a correlation of the rate of change of the fault with one or more environmental parameters.

According to some embodiments, for an identified fault, the method and/or system includes alerting a user of a predicted failure based, at least in part, on the generated model.

According to some embodiments, alerting the user of a predicted failure includes any one or more of a time (or range of times) of a predicted failure, a usage time of the mechanism and characteristics of the mode of failure, or any combination thereof.

According to some embodiments, identifying at least one change in the signals includes identifying a change in the rate of change in the signals.

According to some embodiments, the one or more environmental parameters include at least one of temperature, season or time of the year, pressure, time of day, hours of operation of the mechanism or the component thereof, duration of operation of the mechanism or the component thereof, an identified user of the mechanism, GPS location, mode of operation of the mechanism or the component thereof, or any combination thereof.

According to some embodiments, for an identified fault, the method and/or system includes outputting a prediction of when the identified fault is likely to lead to failure in the mechanism or the component thereof, based, at least in part, on the generated model.

According to some embodiments, predicting when a failure is likely to occur in the mechanism or the component thereof is based, at least in part, on known future environmental parameters.

According to some embodiments, the mode of failure includes at least one of a change in dimension, a change in position, a change in color, a change in texture, change in size, a change in appearance, a fracture, a structural damage, a crack, crack size, critical crack size, crack location, crack propagation, a specified pressure applied to the mechanism or the component thereof, a change in the movement of one component in relation to another component, an amount of leakage, a rate of leakage, change in rate of leakage, amount of accumulated liquid, a change in the amount of accumulated liquid size of formed bubbles, drops, puddles, jets, or any combination thereof.

According to some embodiments, for an identified fault, the method and/or system includes, if the identified change is not classified as being associated with a mode of failure, storing and/or using data associated with the identified change for further investigation, wherein the further investigation includes at least one of adding a mode of failure, updating the algorithm configured to identify the change, and training the algorithm to ignore the identified change in the future, thereby improving the algorithm configured to identify the change.

According to some embodiments, obtaining data associated with characteristics of at least one mode of failure of the mechanism or the component thereof includes data associated with a location of the mode of failure on the mechanism or the component thereof and/or a specific type of mode of failure.

According to some embodiments, obtaining data associated with characteristics of at least one mode of failure of the mechanism or the component thereof includes receiving inputted data from a user.

According to some embodiments, for an identified fault, the method and/or system includes analyzing the received signal and wherein obtaining data associated with characteristics of at least one mode of failure of the mechanism or the component thereof includes automatically retrieving the data from a database, based, at least in part, on the received signals from at least one optical sensor.

According to some embodiments, obtaining data associated with characteristics of at least one mode of failure of the mechanism or the component thereof includes identifying a previously unknown failure mode by applying the received signals to a mechanism learning algorithm configured to determine a mode of failure of the mechanism or the component thereof.

According to some embodiments, identifying the at least one change in the signals includes analyzing raw data of the received signals.

According to some embodiments, the at least one signal includes at least one image, a portion of an image, a set of images, or a video.

According to some embodiments, identifying the at least one change in the signals includes analyzing dynamic movement of the mechanism or the component thereof, wherein the dynamic movement including any one or more of linear movement, rotational movement, periodic (repetitive) movement, damage, defect, crack size/length, crack growth rate, crack propagation, fracture, structural damage, defect diameter, cut, warping, inflation, deformation, abrasion, wear, corrosion, oxidation, sparks, smoke, fluid flow rate, drop size, fluid volume, rate of accumulation of liquid, change in texture, change in color/shade, size of formed bubbles, drops, puddle forming, puddle propagation, a change in dimension, a change in position, a change in color, a change in texture, change in size, a change in appearance, or any combination thereof.

According to some embodiments, for an identified fault, the method and/or system includes identifying at least one segment within the received signals, to be monitored, and wherein the at least one change in the signals is a change within the at least one segment. According to some embodiments, the at least one segment may be automatically identified. According to some embodiments, the at least one segment may be manually identified by a user.

According to some embodiments, for an identified fault, the method and/or system includes monitoring the at least one segment and detecting a change in the shape of the at least one segment, size of the at least one segment, rate of occurrence of the at least one segment in the received signals, or any combination thereof.

According to some embodiments, the at least one segment includes the boundaries of a surface defect.

According to some embodiments, the at least one segment includes the boundaries of at least one of a perimeter of a puddle, a perimeter of a droplet, a perimeter of a saturated area (or material), or any combination thereof.

According to some embodiments, the at least one segment includes the boundaries of a spark.

According to some embodiments, the at least one segment includes the boundaries of a specific element of the mechanism or the component thereof, and further including identifying a geometrical shape of the at least one segment as the specific element of the mechanism or the component thereof.

According to some embodiments, the specific element includes any one or more of a screw, a connector, a bolt, one or more vehicles components, one or more fuel tanks, oil tanks, motors, gear box, turbine components, cables, belts, wires, fasteners, cylinders, blades, nuts, one or more flexible, semi-rigid, or rigid pipes/tubes, and any combination thereof. Each option is a separate embodiment.

According to some embodiments, the specific element includes a brake pad.

According to some embodiments, identifying the geometrical shape includes analyzing any one or more of the total intensity, variance intensity, spackle detection, line segment detection, line segment registration, edge segment curvature estimation, homography estimation, specific object identification, object detection, semantic segmentation, background model, change detection, detection over optical flow, or reflection detection, flame detection, or any combination thereof.

According to some embodiments, for an identified fault, the method and/or system includes outputting data associated with an optimal location for placement of the optical sensor, from which potential modes of failure can be detected.

According to some embodiments, for an identified fault, the method and/or system includes at least one light source configured to illuminate the mechanism or the component thereof, and wherein classifying whether the identified change in the signals is associated with a mode of failure of the mechanism or the component thereof is based, at least in part, on any one or more of the placement(s) of the at least one light source, the duration of illumination, the wavelength, the intensity, the direction of illumination, and the frequency of illumination.

According to some embodiments, the system is configured to monitor a mode of failure of a screw, and further including: identifying at least one segment including boundaries of a perimeter of the visible portion of the screw, within the received signals, such that identifying the at least one change in the received signals includes identifying a change or rate of change of the shape of the at least one segment, wherein the mode of failure includes loosening of the screw and/or rotation of the screw, and wherein generating at least one model of a trend in the identified change includes modeling a trend in the size and/or orientation of the segment, thereby monitoring whether the screw is loosened and/or rotated.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

According to an aspect of some embodiments of the present invention there is provided a system for monitoring health of a mechanism. The system includes processing circuitry configured to:

identify, within image data of multiple components of the mechanism, relative motions of reference points on at least two of the plurality of components of the mechanism;

evaluate the health of the mechanism by analyzing the relative motions using a model of proper operation of the mechanism; and output an indicator of the health of the mechanism based on the evaluating.

According to some embodiments of the invention, the indicator comprises at least one of:

maintenance instructions;
a time to failure estimation;
a detected failure alert; and
operating instructions in response to detected failure.

According to some embodiments of the invention, at least two of the plurality of components comprise at least one component in rotational motion and at least one component in linear motion.

According to some embodiments of the invention, the analyzing comprises determining an alignment of the reference points when the reference points are static, and the indicator indicates when the reference points are correctly aligned and incorrectly aligned relative to each other.

According to some embodiments of the invention, the analyzing comprises comparing relative trajectories of the reference points to trajectories specified by the model, and the indicator comprises an alert when the relative trajectories are outside a tolerance of the model.

According to some embodiments of the invention, wherein the analyzing comprises estimating respective forces exerted on the at least two of the plurality of components during operation of the mechanism from the relative motions, and the indicator indicates the estimated levels of force.

According to some embodiments of the invention, the processing circuitry is further configured to monitor at least one defect the plurality of components and the evaluating the health of the machine is further based on the monitoring of the at least one defect.

According to some embodiments of the invention, the processing circuitry is further configured to detect, from the image data, a deformation of a component of the mechanism during operation of the mechanism, and the indicator indicates one of a distortion and lack of distortion of the component of the mechanism.

According to some embodiments of the invention, the processing circuitry is further configured to evaluate the health of the mechanism by monitoring a change in a shape of at least one of the plurality of components over time.

According to some embodiments of the invention, the evaluating the health of the mechanism is further based on at least one of:

a force exerted on at least one of the plurality of components;
a defect in at least one of the plurality of components;
a deformation of at least one of the plurality of components;
a change in shape of at least one of the plurality of components; and
information from at least one non-imaging sensor.

According to some embodiments of the invention, the indicator comprises maintenance requirements for at least one of the plurality of components of the mechanism, the maintenance requirements being based on image data compiled during multiple operations of the mechanism.

According to some embodiments of the invention, wherein the mechanism comprises a subsystem of a vehicle.

According to some embodiments of the invention, the subsystem is positioned between a body of the vehicle and a surface supporting the vehicle.

According to some embodiments of the invention, the mechanism comprises a landing gear of an aircraft.

According to some embodiments of the invention, the indicator indicates one of a locked and an unlocked state of the landing gear.

According to some embodiments of the invention, the analyzing comprises estimating a degree of hardness of a landing of the aircraft from the relative motions, and the indicator indicates the degree of hardness of the landing of the aircraft.

According to some embodiments of the invention, the model is trained using a training set of images collected during operation of the mechanism and/or a similar mechanism.

According to some embodiments of the invention, at least one of the reference points is detected automatically as a result of the training of the model.

According to some embodiments of the invention, at least one of the reference points is specified by a user.

According to some embodiments of the invention, the model is periodically retrained based on the image data collected during further operation of the mechanism or similar mechanisms.

According to some embodiments of the invention, the system further comprises at least one optical sensor positioned to collect image data from at least one of the plurality of components of the mechanism.

According to some embodiments of the invention, the system further comprises multiple optical sensors positioned to provide image data of a same one of the plurality components of the mechanism, wherein the image data of the same one of the plurality of components is processed into a three-dimensional image.

According to an aspect of some embodiments of the present invention there is provided a method for monitoring health of a mechanism, comprising:

inputting image data of multiple components of the mechanism from at least one optical sensor;
identifying, within the image data, relative motions of reference points on at least two of the plurality of components of the mechanism;
evaluating the health of the mechanism by analyzing the relative motions using a model of proper operation of the mechanism; and
output an indicator of the health of the mechanism based on the evaluating.

According to some embodiments of the invention, the indicator comprises at least one of:

maintenance instructions;
a time to failure estimation;
a detected failure alert; and
operating instructions in response to detected failure.

According to some embodiments of the invention, at least two of the plurality of components comprise at least one component in rotational motion and at least one component in linear motion.

According to some embodiments of the invention, the analyzing comprises determining relative dispositions of the reference points when the reference points are static, and the indicator indicates when the reference points are correctly disposed and incorrectly disposed relative to each other.

According to some embodiments of the invention, the analyzing comprises comparing relative trajectories of the reference points to trajectories specified by the model, and the indicator comprises an alert when the relative trajectories are outside a tolerance of the model.

According to some embodiments of the invention, wherein the analyzing comprises estimating respective forces exerted on the at least two of the plurality of components during operation of the mechanism from the relative motions, and the indicator indicates the estimated levels of force.

According to some embodiments of the invention, the method further includes monitoring at least one defect in the plurality of components and the evaluating the health of the mechanism is further based on the monitoring of the at least one defect.

According to some embodiments of the invention, the method further includes detecting, from the image data, a deformation of a component of the mechanism during operation of the mechanism, and the indicator indicates one of a distortion and lack of distortion of the component of the mechanism.

According to some embodiments of the invention, the method further includes evaluating the health of the mechanism by monitoring a change in a shape of at least one of the plurality of components over time.

According to some embodiments of the invention, evaluating the health of the mechanism is further based on at least one of:
- a force exerted on at least one of the plurality of components;
- a defect in at least one of the plurality of components;
- a deformation of at least one of the plurality of components;
- a change in shape of at least one of the plurality of components; and
- information from at least one non-imaging sensor.

According to some embodiments of the invention, the indicator comprises maintenance requirements for at least one of the plurality of components of the mechanism, the maintenance requirements being based on image data compiled during multiple operations of the mechanism.

According to some embodiments of the invention, mechanism comprises a subsystem of a vehicle.

According to some embodiments of the invention, the subsystem is positioned between a body of the vehicle and a surface supporting the vehicle.

According to some embodiments of the invention, the mechanism comprises a landing gear of an aircraft.

According to some embodiments of the invention, the indicator indicates one of a locked state and an unlocked state of the landing gear.

According to some embodiments of the invention, the analyzing comprises estimating a degree of hardness of a landing of the aircraft from the relative motions, and the indicator indicates the degree of hardness of the landing of the aircraft.

According to some embodiments of the invention, the method further includes training the model using a training set of images collected during operation of the mechanism and/or similar mechanisms.

According to some embodiments of the invention, at least one of the reference points is detected automatically as a result of the training of the model.

According to some embodiments of the invention, at least one of the reference points is specified by a user.

According to some embodiments of the invention, the model is periodically retrained based on the image data collected during further operation of the mechanism.

According to some embodiments of the invention, the method further includes processing multiple images of a component of the mechanism into a three-dimensional image of the component, the three-dimensional image serving as input into the model.

According to some embodiments of the invention, the analyzing is further based on data input from non-imaging sensors.

According to an aspect of some embodiments of the present invention there is provided a system for detecting a state of a mechanism, the mechanism comprising multiple components, having at least one specified alignment of the components, comprising a processing circuitry configured to:
- identify, within image data of the mechanism, reference points on at least two of the plurality of components;
- based on respective locations of the reference points, determine when the plurality of components of mechanism are in one of the specified alignments; and
- output an indicator of a result of the determining.

According to some embodiments of the invention, the indicator indicates one of: the mechanism being in one of the specified alignments and a stateless condition of the mechanism.

According to some embodiments of the invention, determining when the plurality of components of mechanism are in one of the specified alignments is further based on respective trajectories of the reference points determined from the image data.

According to some embodiments of the invention, determining when the plurality of components of mechanism are in one of the specified alignments is based on a model of proper operation of the mechanism, the model being trained using a training set of images collected during operation of the mechanism and/or a similar mechanism.

According to some embodiments of the invention, at least one of the reference points is detected automatically during the training of the model.

According to some embodiments of the invention, at least one of the reference points is specified by a user.

According to some embodiments of the invention, the mechanism comprises a subsystem of a vehicle.

According to some embodiments of the invention, the subsystem is configured to support a body of the vehicle.

According to some embodiments of the invention, the mechanism comprises a landing gear of an aircraft and the at least one specified alignment of the components comprises a landing gear locked state, wherein the landing gear is configured to be in a locked state during touchdown of the aircraft.

According to some embodiments of the invention, the processing circuitry is further configured to identify a touchdown of the aircraft by analysis of the image data, and to provide a touchdown indication.

According to some embodiments of the invention, further configured to detect, from the image data, a degree of hardness of a landing of the aircraft based on respective motions of at least two reference points on the landing gear during touchdown.

According to some embodiments of the invention, the processing circuitry is further configured to detect, from the image data, a degree of hardness of a landing of the aircraft based on a deformation of a wheel of the landing gear during touchdown.

According to some embodiments of the invention, the processing circuitry is further configured to estimate, from image data collected during a period of operation of the mechanism, a health estimate of the mechanism based on changes in respective trajectories of the reference points on the at least two of the plurality of components, wherein the indicator comprises the health estimate.

According to some embodiments of the invention, processing circuitry is further configured to estimate, from image data collected during a period of operation of the mechanism, a degree of wear on at least two of the multiple components.

According to some embodiments of the invention, the system further comprises at least one optical sensor positioned to collect image data of at least one of the plurality of components and to provide the collected image data to the processing circuitry.

According to some embodiments of the invention, the processing circuitry is configured to perform the determining when the plurality of components of mechanism are in one of the specified alignments based on additional data input from non-imaging sensors.

According to some embodiments of the invention, the image data is collected during operation of the mechanism and the indicator is output in real time.

According to an aspect of some embodiments of the present invention there is provided a method for detecting a state of a mechanism, the mechanism comprising multiple components and having at least one specified alignment of the components, comprising:
 inputting image data of multiple components of the mechanism from at least one optical sensor during operation of the mechanism;
 identifying, from within the input image data, reference points on at least two of the plurality of components;
 based on respective locations of the reference points, determining when the plurality of components of mechanism are in one of the specified alignments; and
 outputting an indicator of a result of the determining.

According to some embodiments of the invention, the indicator indicates one of: the mechanism being in one of the specified alignments and a stateless condition of the mechanism.

According to some embodiments of the invention, the determining when the plurality of components of mechanism are in one of the specified alignments is further based on respective trajectories of the reference points.

According to some embodiments of the invention, the determining when the plurality of components of mechanism are in one of the specified alignments is based on a model of proper operation of the mechanism, the model being trained using a training set of images collected during operation of the mechanism and/or a similar mechanism.

According to some embodiments of the invention, the method further includes detecting at least one of the reference points automatically during the training of the model.

According to some embodiments of the invention, at least one of the reference points is specified by data input via a communication interface.

According to some embodiments of the invention, the mechanism comprises a subsystem of a vehicle.

According to some embodiments of the invention, the subsystem is configured to support a body of the vehicle on a surface.

According to some embodiments of the invention, the mechanism comprises a landing gear of an aircraft and the at least one specified alignment of the components comprises a landing gear locked state, the landing gear being configured to be in a locked state during touchdown of the aircraft.

According to some embodiments of the invention, the method further includes: identifying a touchdown of the aircraft based on an analysis of the image data; and providing a touchdown indication.

According to some embodiments of the invention, the method further includes detecting, from the image data, a degree of hardness of a landing of the aircraft based on respective motions of at least two reference points on the landing gear during touchdown.

According to some embodiments of the invention, the method further includes detecting, from the image data, a degree of hardness of a landing of the aircraft based on a deformation of a wheel of the landing gear during touchdown.

According to some embodiments of the invention, the method further includes estimating, from image data collected during a period of operation of the mechanism, health of the mechanism based on duration of a time period while the mechanism transitions between a first and a second specified alignment of the components.

According to some embodiments of the invention, the method further includes estimating, from image data collected during a period of operation of the mechanism, a health estimate of the mechanism based on changes in respective trajectories of the reference points on the at least two of the plurality of components, wherein the indicator comprises the health estimate.

According to some embodiments of the invention, the method further includes estimating, from image data collected during a period of operation of the mechanism, a degree of wear on the at least two of the plurality of components.

According to some embodiments of the invention, the method further includes inputting the image data from at least one optical sensor positioned to provide image data of at least one of the plurality of components.

According to some embodiments of the invention, the determining is based on additional data input from non-imaging sensors.

According to an aspect of some embodiments of the present invention there is provided a computer program product comprising a computer useable medium having computer readable program code embodied therein for use in detecting a state of a mechanism, the computer program product comprising:
 computer readable program code for causing the computer to input image data of multiple components of the mechanism from at least one optical sensor during operation of the mechanism;
 computer readable program code for causing the computer to identify, from within the input image data, reference points on at least two of the multiple components;
 computer readable program code for causing the computer to determine, based on respective locations of the reference points, when the components of mechanism are in one of the specified alignments; and
 computer readable program code for causing the computer to output an indicator of a result of the determined alignment or non-alignment.

According to an aspect of some embodiments of the present invention there is provided a computer program product comprising a computer useable medium having computer readable program code embodied therein for use in monitoring the health of a mechanism, the computer program product comprising:

computer readable program code for causing the computer to input image data of multiple components of the mechanism from at least one optical sensor;

computer readable program code for causing the computer to identify, from within the input image data, relative motions of reference points on at least two of the multiple components of the mechanism;

computer readable program code for causing the computer to evaluate the health of the mechanism by analyzing the relative motions using a model of proper operation of the mechanism; and computer readable program code for causing the computer to output an indicator the health of the mechanism based on the evaluation.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

For the sake of clarity, some objects depicted in the figures are not drawn to scale. Moreover, two different objects in the same figure may be drawn to different scales.

In block diagrams and flowcharts, optional elements/components and optional stages may be included within dashed boxes.

Figure 1A:
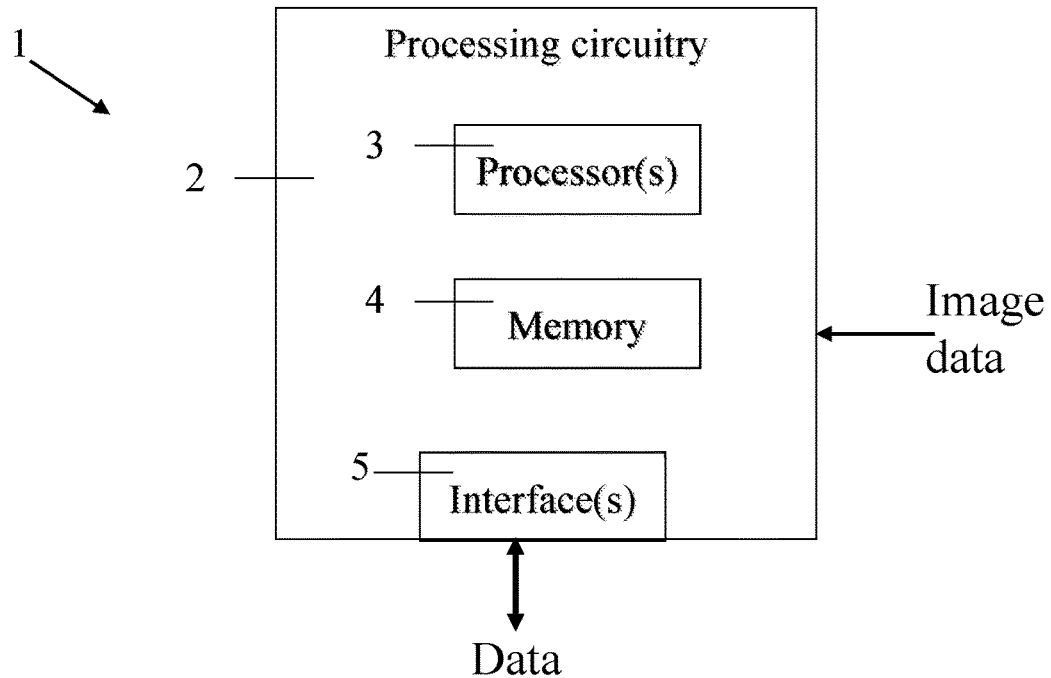
Figure 1B:
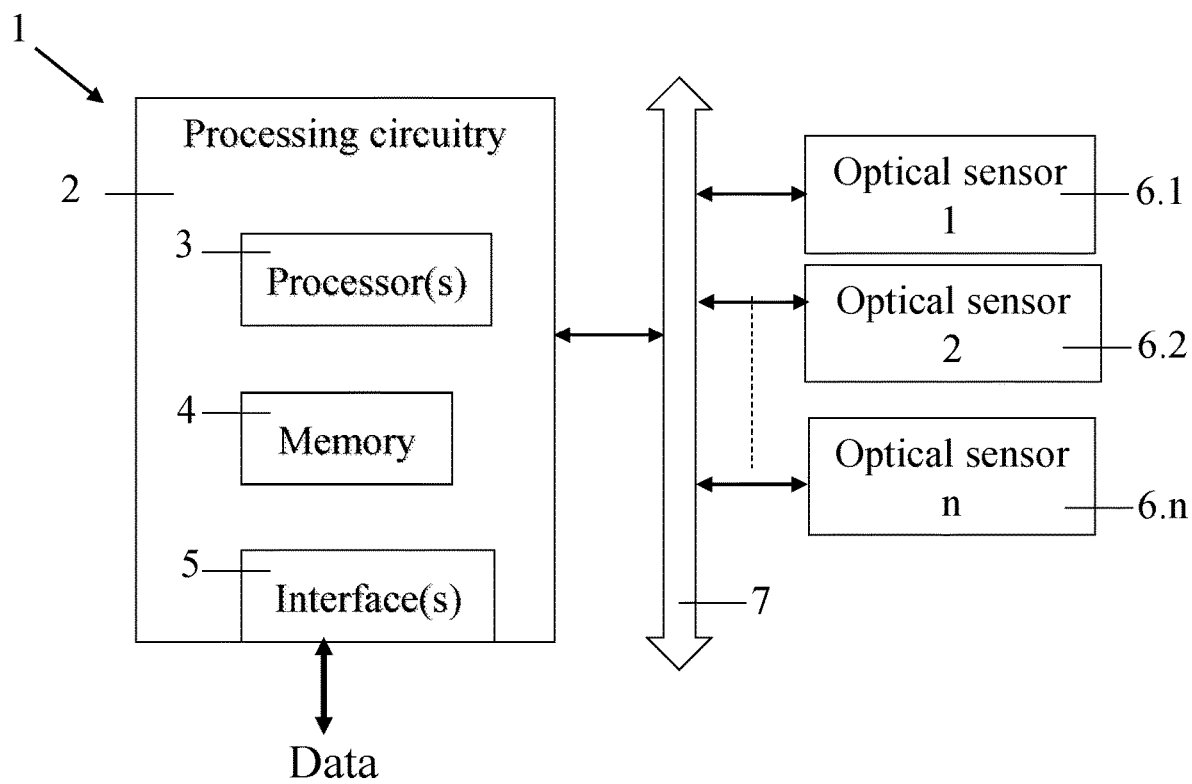
Figure 1C:
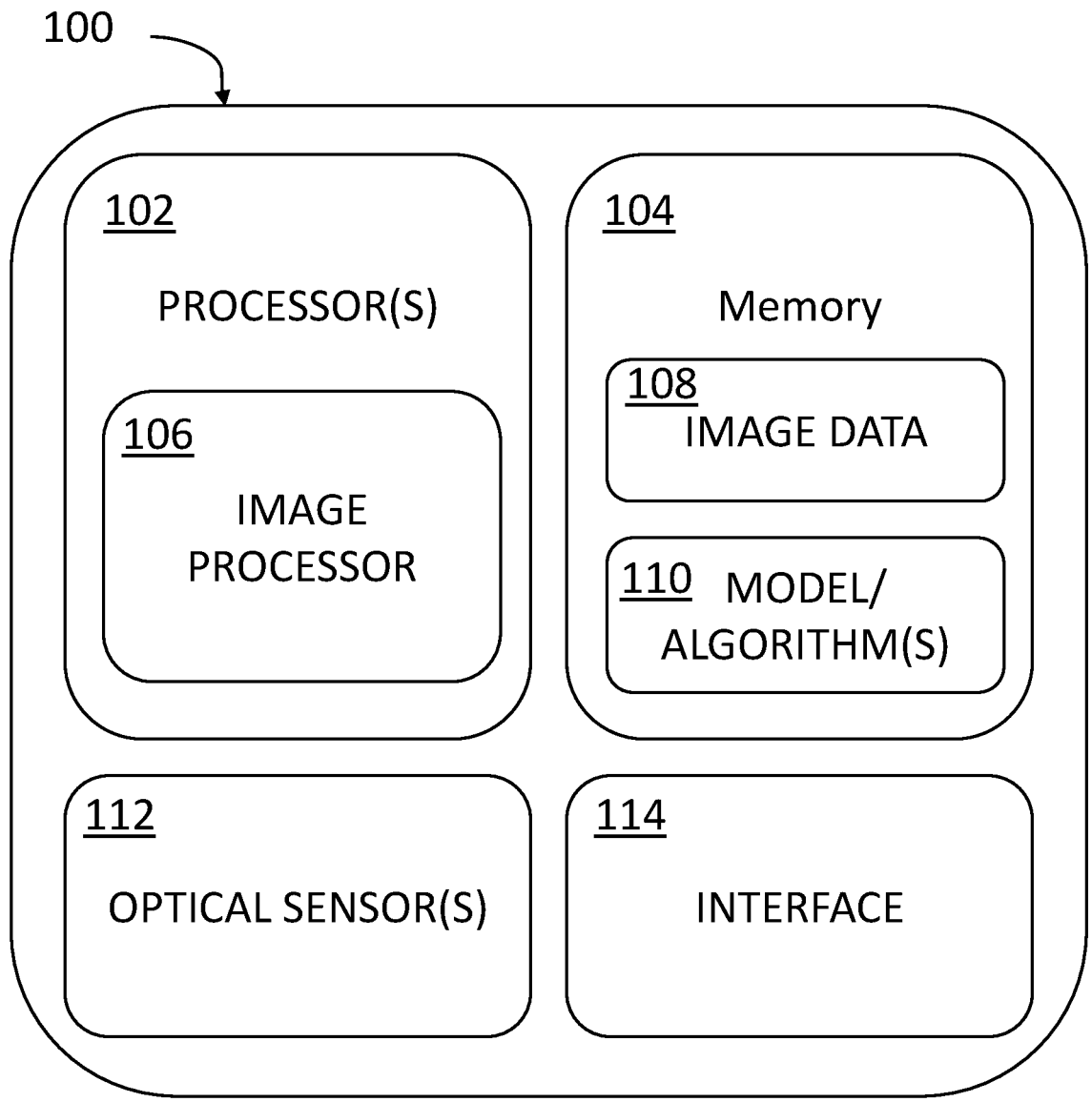
Figure 2A:
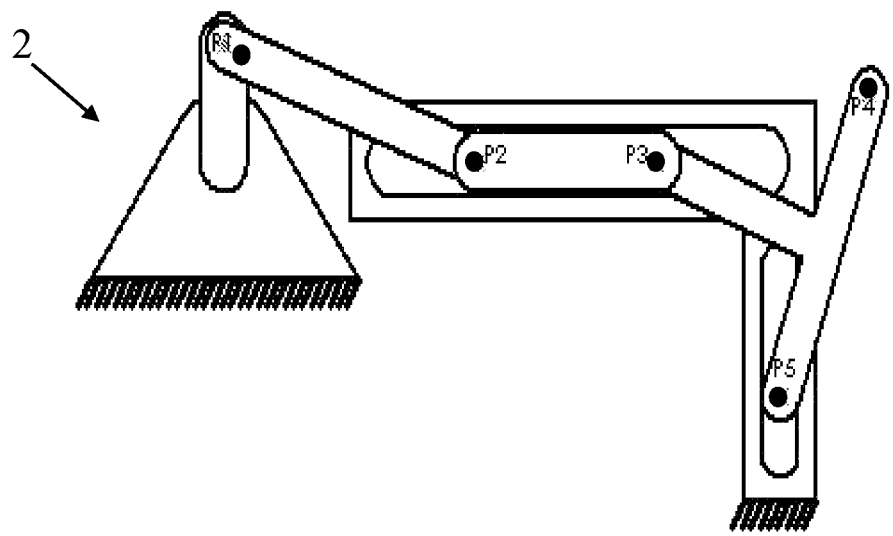
Figure 2B:
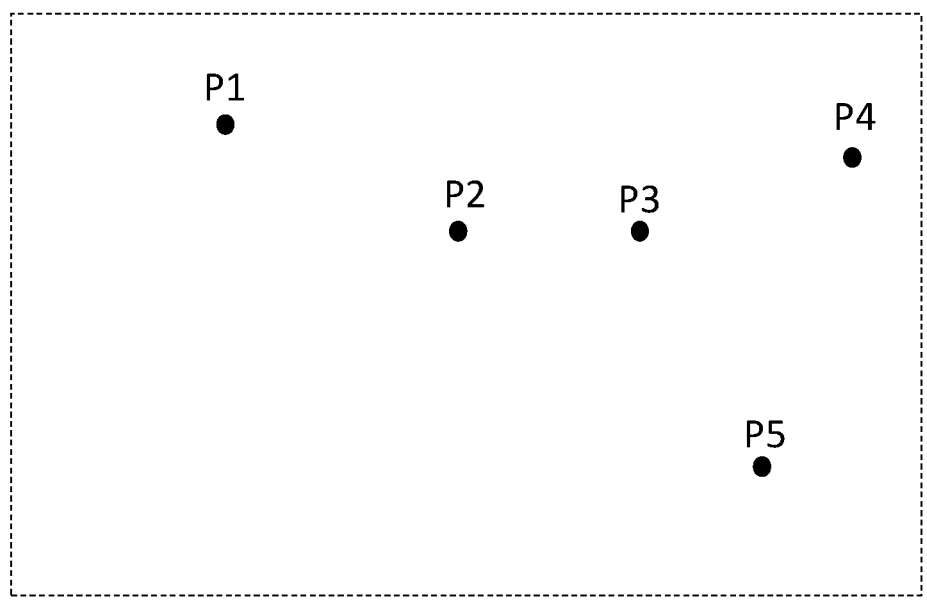
Figure 2C:
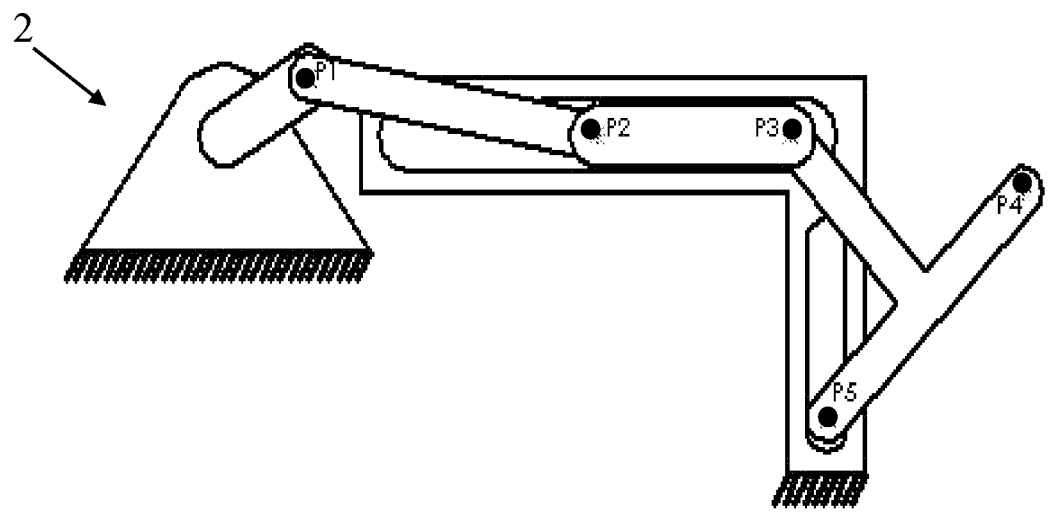
Figure 2D:
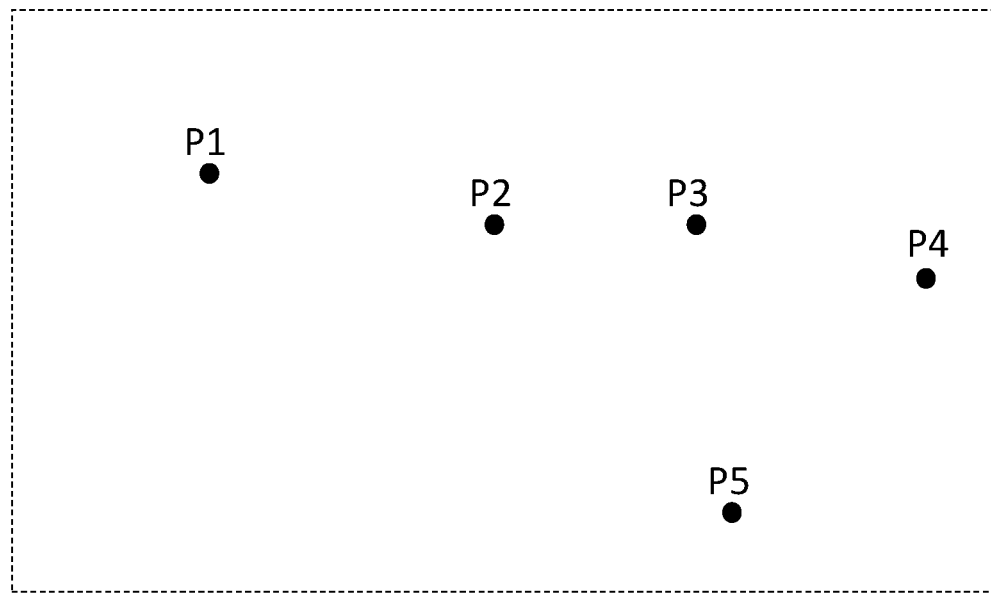
Figure 2E:
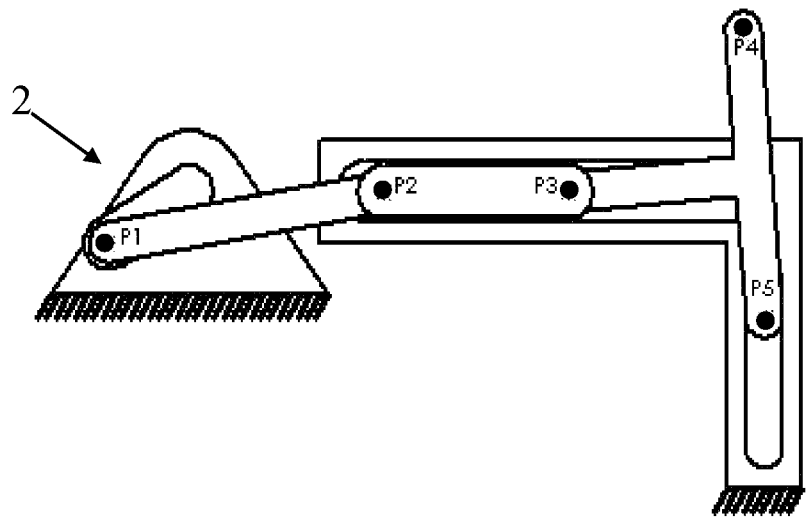
Figure 2F:
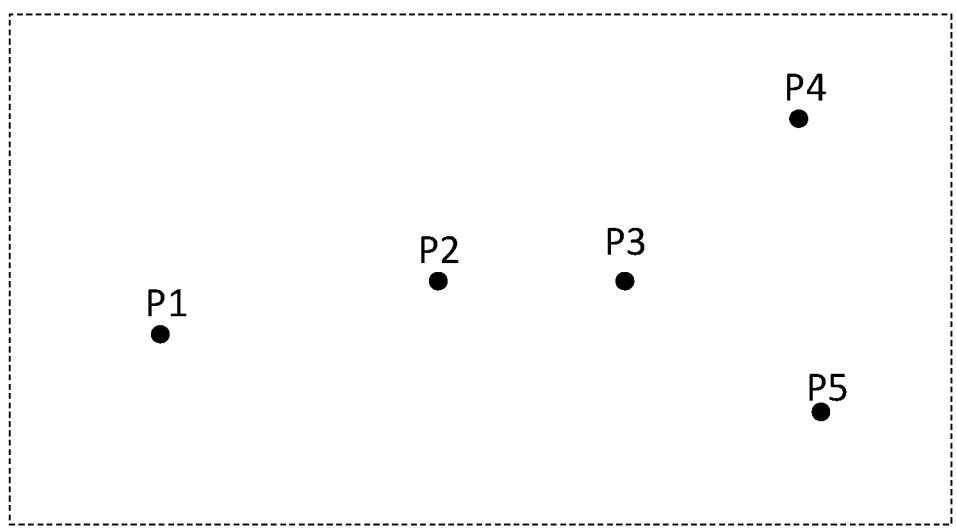
Figure 2G:
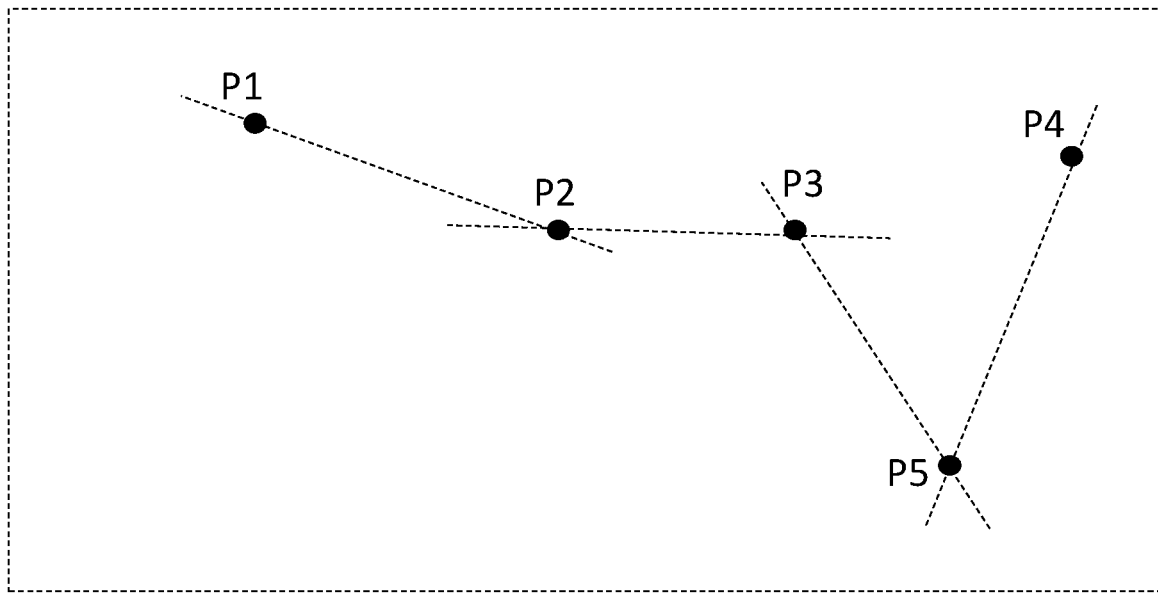
Figure 2H:
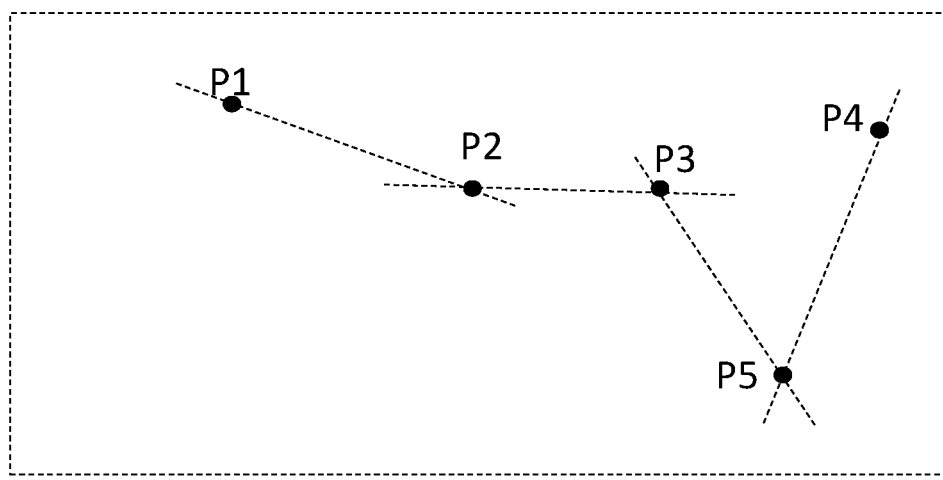
Figure 4:
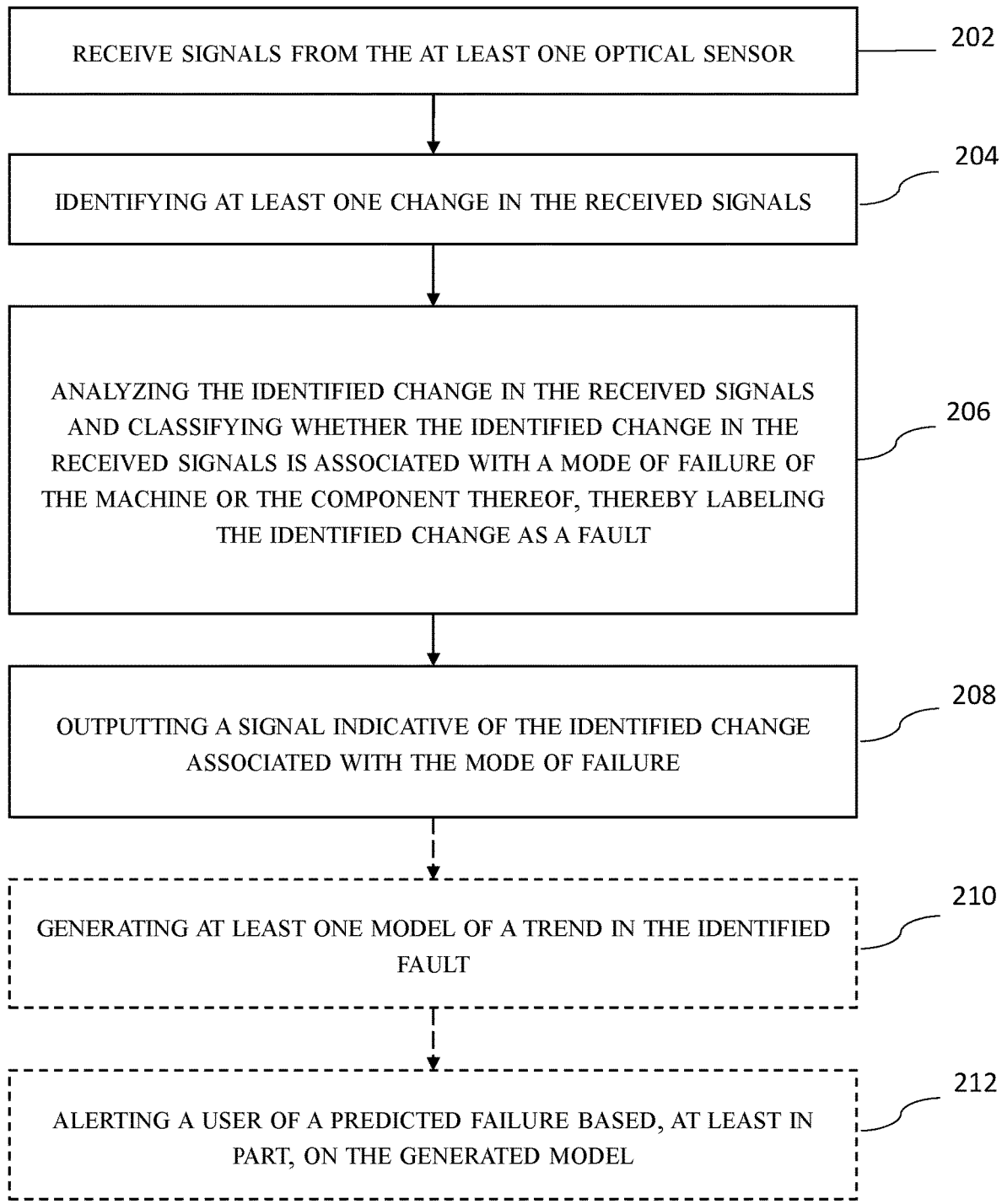
Figure 5:
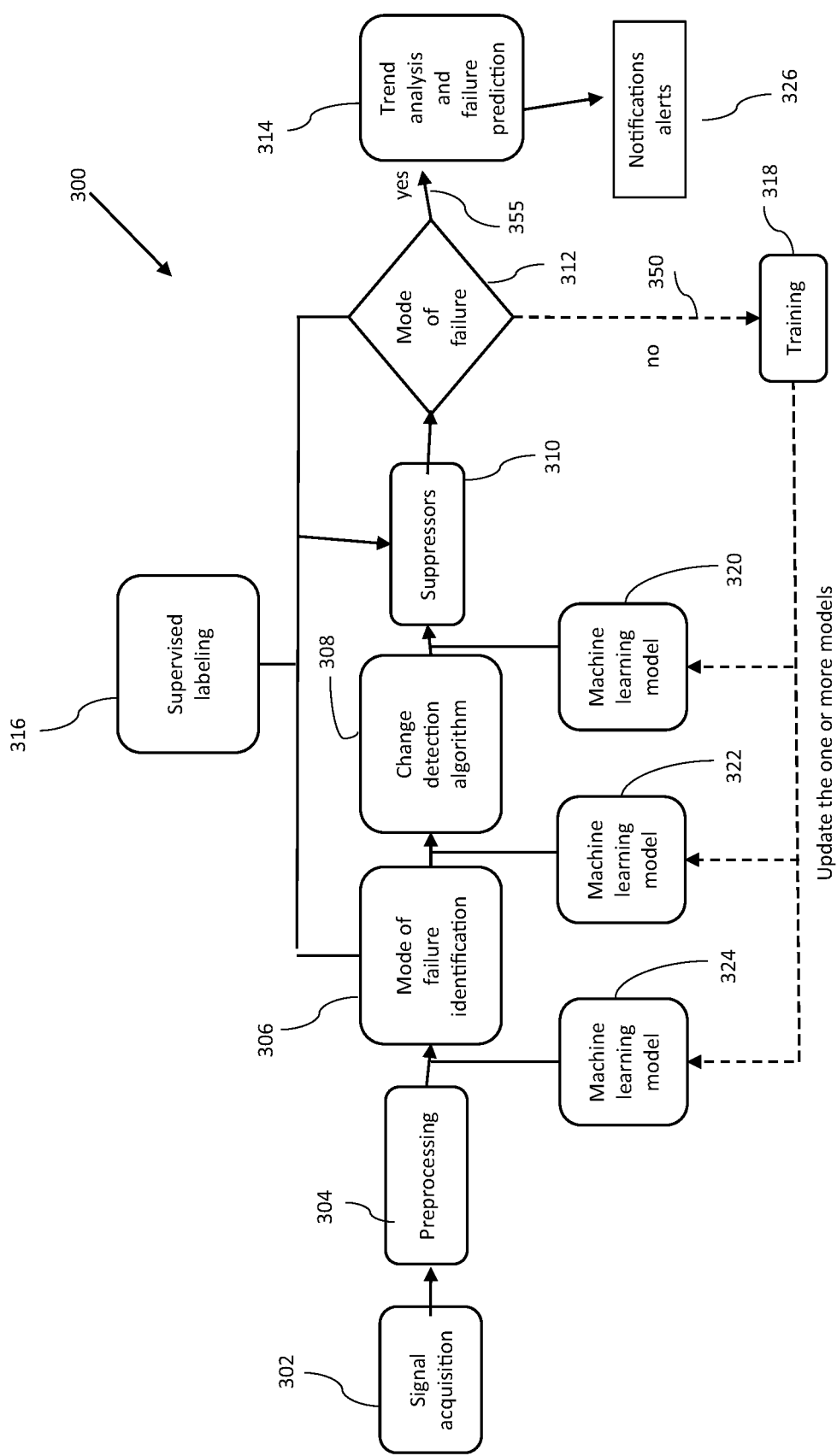
Figure 6:
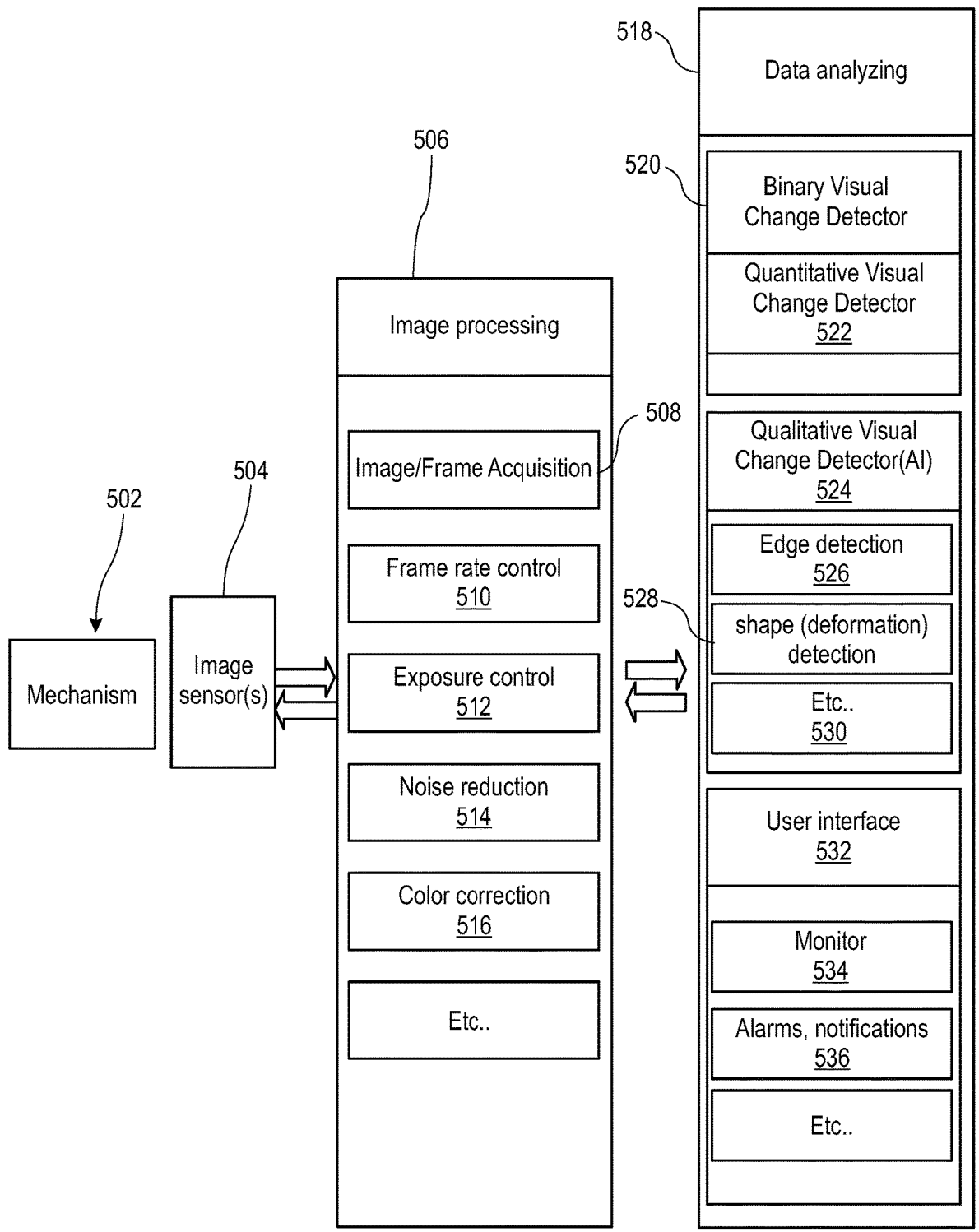
Figure 7:
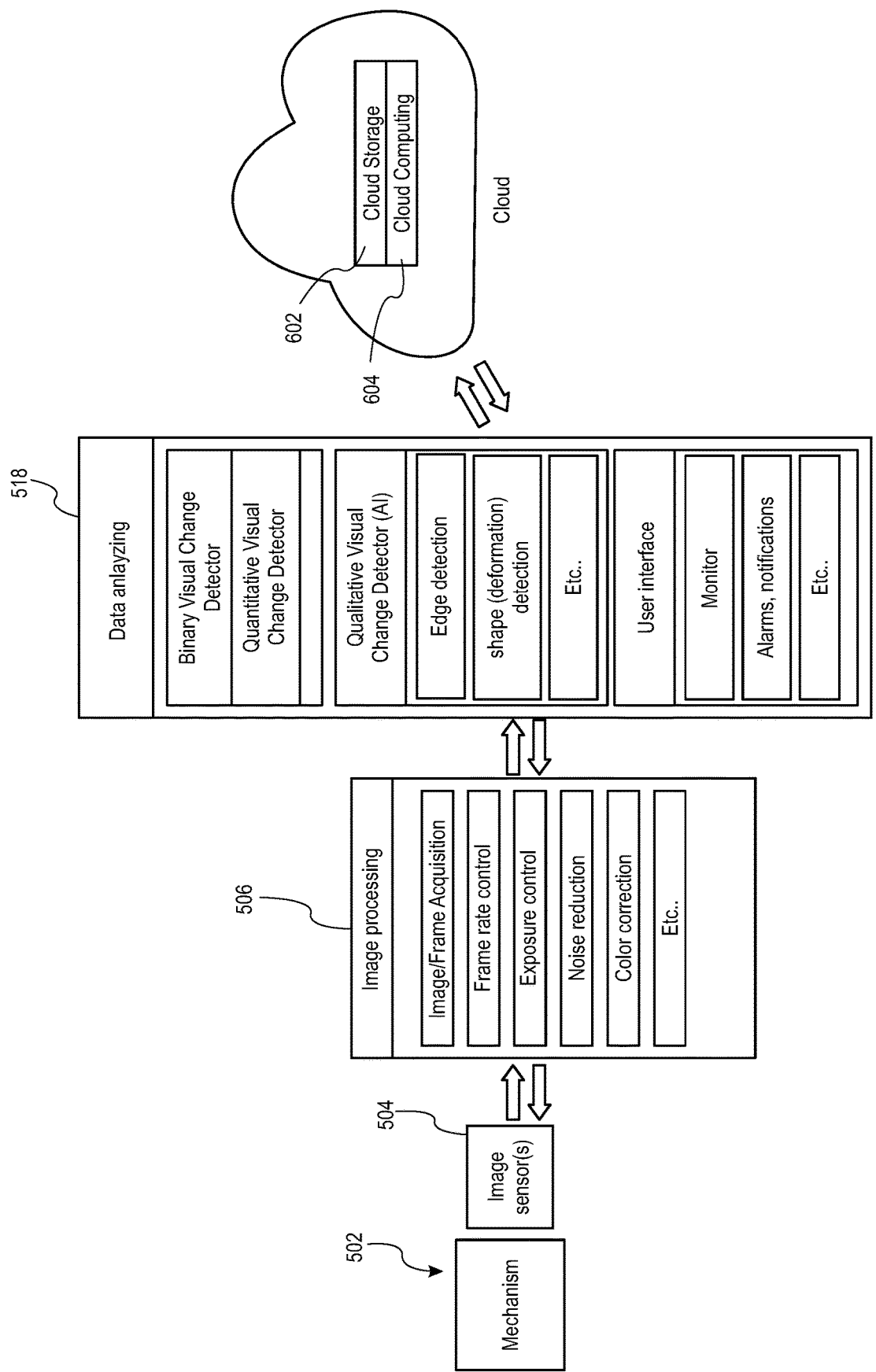
Figure 8A:
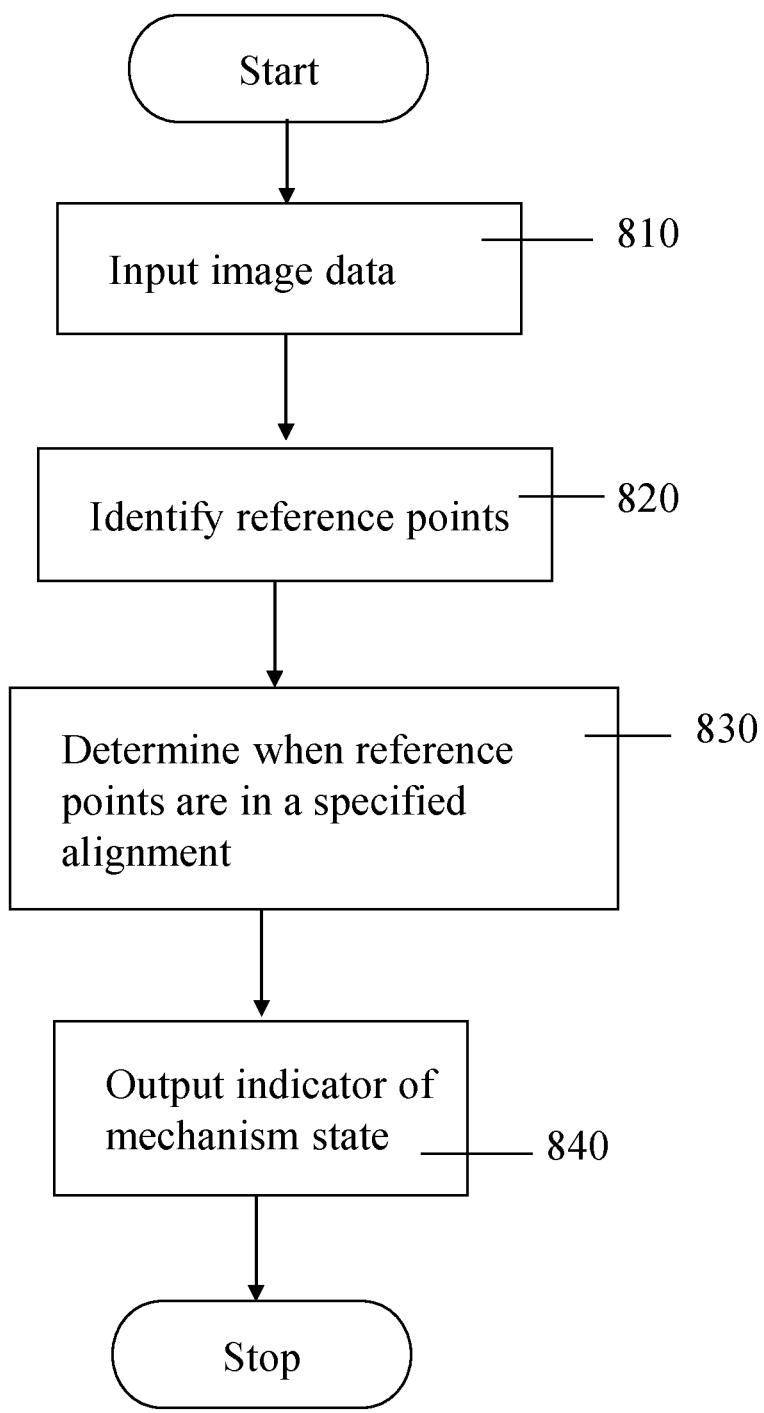
Figure 8B:
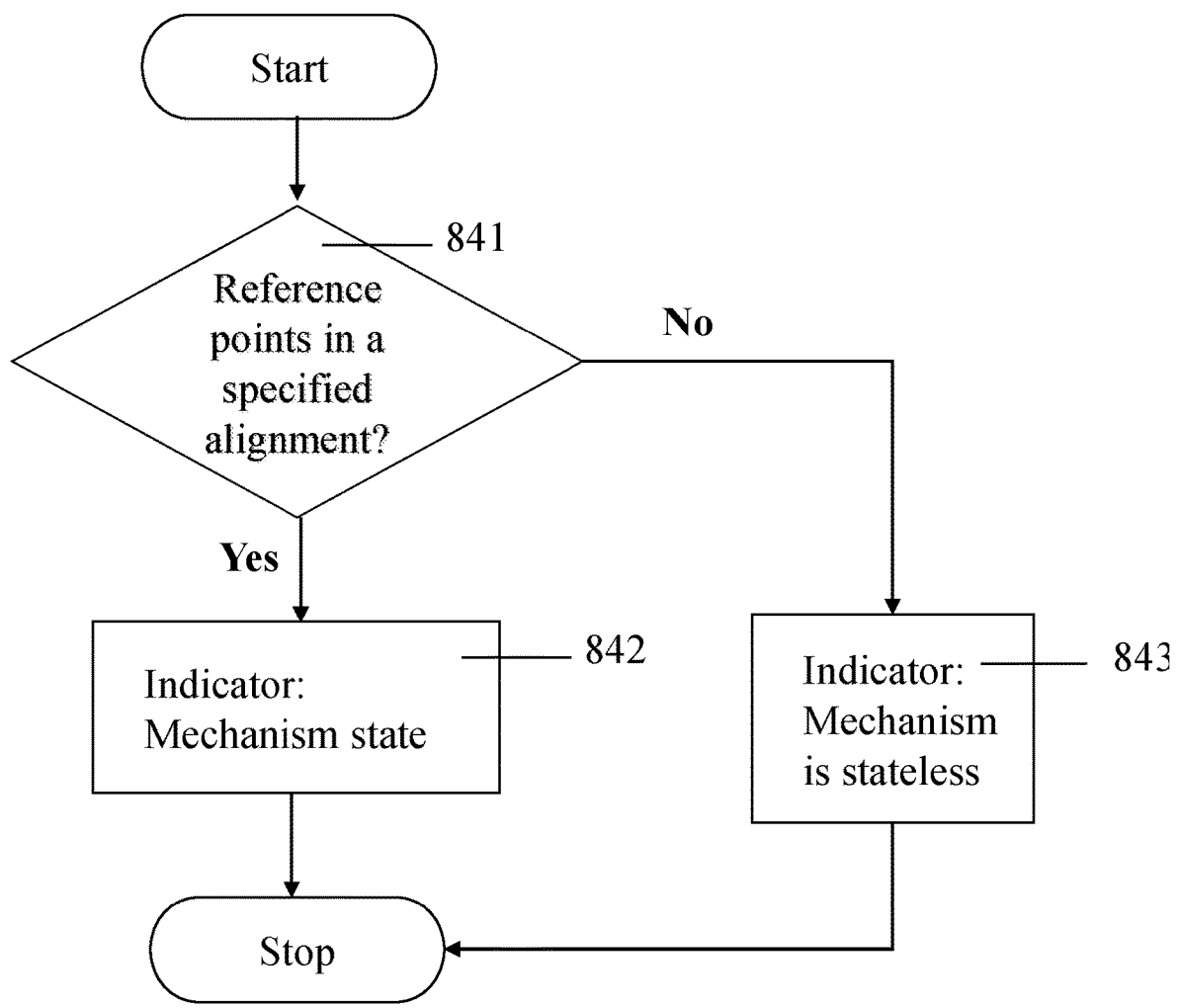
Figure 9A:
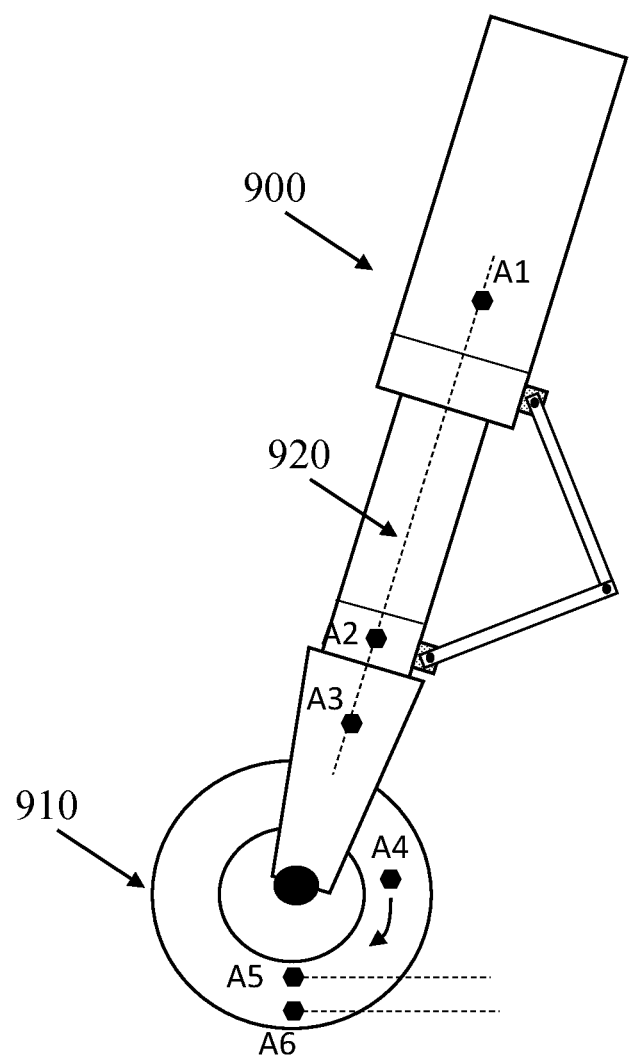
Figure 9B:
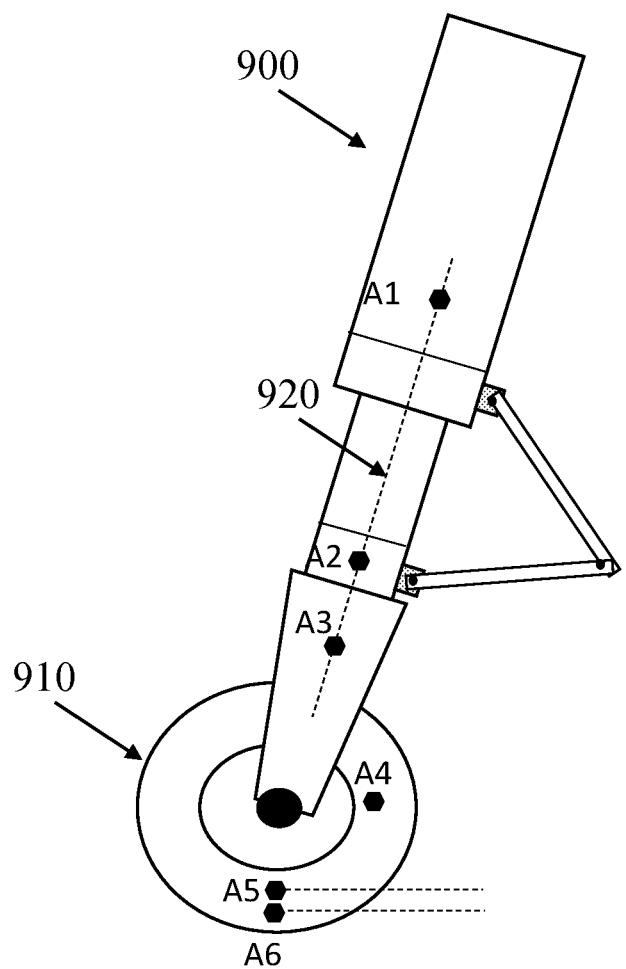
Figure 10:
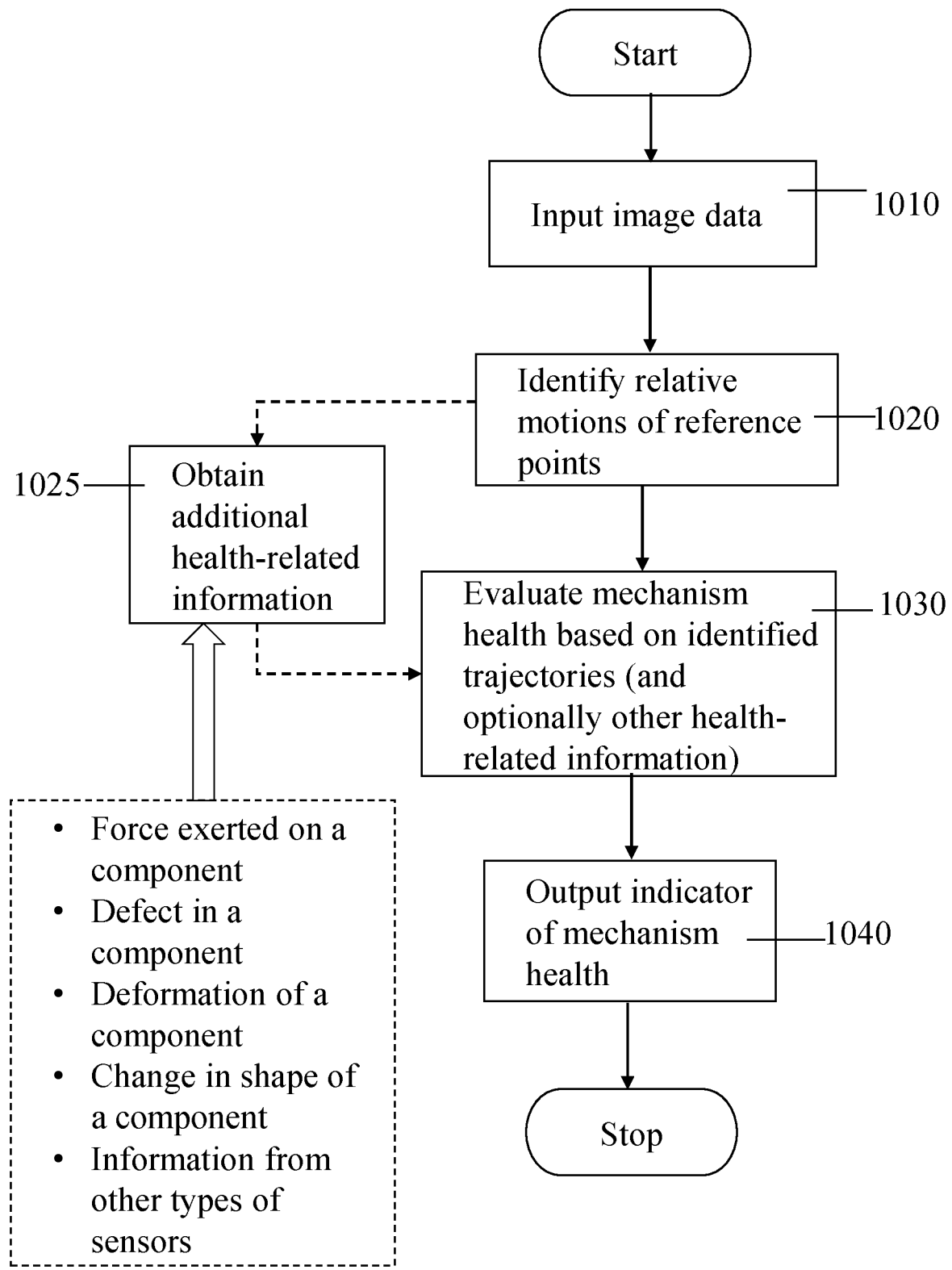

In the figures:

FIGS. 1A-1B are simplified block diagrams of a system for monitoring a mechanism and/or a component thereof, in accordance with respective embodiments of the present invention;

FIG. 1C is a simplified block diagram of a system for monitoring a mechanism and/or a component thereof, in accordance with some exemplary embodiments of the present invention;

FIGS. 2A-2F illustrate side views and reference point alignments in three states of an exemplary mechanism;

FIGS. 2G-2H illustrate how reference point alignments indicate a state of the exemplary mechanism;

FIGS. 3A-3F illustrate respective trajectories of the reference points on the exemplary mechanism;

FIG. 4 is a simplified flowchart of a method for monitoring potential failure in a landing gear or a component thereof, in accordance with some embodiments of the present invention;

FIG. 5 is a simplified schematic diagram of a method for monitoring potential failure in a mechanism and/or a component thereof, in accordance with some embodiments of the present invention;

FIG. 6 is a simplified block diagram of a system for monitoring potential failure in a mechanism and/or a component thereof, in accordance with some embodiments of the present invention;

FIG. 7 is a simplified block diagram of a system for monitoring potential failure in a mechanism and/or a component thereof in communication with a cloud storage module, in accordance with some embodiments of the present invention;

FIG. 8A is a simplified flowchart of a method for determining the state of a mechanism, according to some embodiments of the present invention;

FIG. 8B is a simplified flowchart of a method for outputting an indicator of mechanism health, according to some embodiments of the present invention;

FIGS. 9A-9B are simplified diagrams of a landing gear before and during touchdown respectively; and FIG. 10 is a simplified flowchart of a method for monitoring the health of a mechanism according to some embodiments of the present invention.

DESCRIPTION OF SPECIFIC EMBODIMENTS OF THE INVENTION

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without all specific details being presented herein. Furthermore, for clarity some features known in the art may be omitted or simplified in order not to obscure the invention.

Reference is now made to FIGS. 1A-1B, which are simplified block diagrams of a system for monitoring a mechanism or a component thereof, in accordance with respective embodiments of the present invention.

As described below, embodiments of the monitoring system may be employed for many purposes including but not limited to:

1) Determining whether the mechanism is in a defined state or is not in a defined state (i.e. is stateless), and optionally determining between which of the defined states the mechanism is in;
2) Determining whether the mechanism is in locked state or an unlocked state;
3) Monitoring the health of the mechanism and/or components thereof;
4) Monitoring potential failure of the mechanism; and
5) Determining the integrity and proper function of the mechanism.

In accordance with the embodiments of FIG. 1A, system 1 for monitoring a mechanism or a component thereof (also denoted herein a monitoring system) includes processing circuitry 2. Processor circuitry includes one or more processors 3. Processor(s) 3 process the image data provided by the image data and perform the analyses described herein. Processor(s) 3 may also perform other tasks, such as providing a graphical user interface (GUI) to a user and processing inputs from the GUI and/or other input/output means.

Optionally monitoring system 1 further includes memory 4 for internal storage of data for use by monitoring system 1. The stored data may include but is not limited to:

a) Image data;
 b) Program instructions;

c) Algorithms and rules for monitoring a mechanism; and
d) A model of the mechanism, optionally developed by machine learning from a training set of images of the mechanism or similar mechanism(s). The model is developed in accordance with the type of implemented by the system. For example, the model may input images of components of the mechanism and output a state the mechanism is in, the health of the mechanism, an indicator of mechanism failure, etc.

Optionally, processing circuitry 2 further includes one or more interface(s) 5 for inputting and/or outputting data. For example, the interface may serve to input image data and/or communicate with other components in a machine and/or to communicate with external machines or systems and/or to provide a user interface.

In one example, indicators and information about the mechanism's state, health and so forth are provided via interface(s) 5 to a HUMS, CBM or similar systems.

In a second example, a locked state indicator may be provided to an aircraft navigation system, so that the aircraft control system does not enable the aircraft to touch down or provides an indication of a severe failure when the landing gear is unlocked.

In accordance with the embodiments of FIG. 1B, system 1 further includes one or more optical sensors 6.1-6.n, which provide the image data used to monitor the mechanism. Optionally, optical sensors 6.1-6.n provide the image data to the processor over databus 7.

According to some embodiments, optical sensors 6.1-6.n may include a camera. According to some embodiments, optical sensors 6.1-6.n may include an electro-optical sensor. According to some embodiments, optical sensors 6.1-6.n may include any one or more of a charge-coupled device (CCD) and a complementary metal-oxide-semiconductor (CMOS) sensor (or an active-pixel sensor), or any combination thereof. According to some embodiments, optical sensors 6.1-6.n may include any one or more of a point sensor, a distributed sensor, an extrinsic sensor, an intrinsic sensor, a through beam sensor, a diffuse reflective sensor, a retro-reflective sensor, or any combination thereof.

Optionally, processing circuitry 2 controls one or more light sources, where each light source illuminates at least a portion of the mechanism. Optionally, each light source is focused on a specific component or reference point, which may enable reducing the required intensity of the light. Alternately or additionally, the light source(s) are controlled by a user.

By controlling the light sources, processing circuitry 2 and/or the user may improve the image characteristics to ease image processing and analysis. For example, a light source may be adjusted to increase visibility of a reference point. Alternately or additionally, a light source may be adjusted to ease detecting faults and/or surface defects and/or structural defects by increasing shadows that highlight such areas.

According to some embodiments, the light source(s) include one or more of: a light bulb, a light-emitting diode (LED), a laser, an electroluminescent wire, and light transmitted via a fiber optic wire or cable (e.g. from an LED coupled to the fiber optic cable). Other types of light sources may also be suitable.

Optionally, processing circuitry 2 controls one or more of:
1) The direction of illumination of the light source;
2) The duration of illumination;
3) The frequency of illumination;
4) The illumination intensity; and
5) Switching the light source on or off.

According to some embodiments, the light source may emit visible light, infrared (IR) radiation, near IR radiation, ultraviolet (UV) radiation or light in any other spectrum or frequency range.

According to some embodiments, a light source is a strobe light or a light source configured to illuminate in short pulses. According to some embodiments, the light source may be configured to emit strobing light without use of global shutter sensors.

Optionally, processing circuitry 2 selects respective optimal settings for the light source(s) based on a predefined algorithm. Optionally, the light source is controlled in accordance with the environment the system is currently operating in. For example, the light source may be turned on during nighttime operation and turned off during daylight.

Optionally, processing circuitry 2 changes the light source operation dynamically during operation. For example, by using different fibers of a fiber optic cable to emit the light at different times or by emitting light from two or more fibers at once.

Optionally, the light sources are part of system 1.

According to some embodiments, the one or more optical sensors may include one or more lenses and/or a fiber optic sensor. According to some embodiments, optical sensors 6.1-6.n may include a software correction matrix configured to generate an image from the obtained data. According to some embodiments, the one or more optical sensors may include a focus sensor configured to enable the optical sensor to detect changes in the obtained data. According to some embodiments, the focus sensor may be configured to enable the optical sensor to detect changes in one or more pixels of the obtained signals.

According to some embodiments, all or part of processing circuitry 2 is provided within the monitored machine, optionally in a same case as one or more of optical sensors 6. This may be useful, for example, when the machine is an aviation machine where connection to a cloud is more challenging or where privacy is of importance. Alternatively, the image data may be sent to a remote location or cloud where processing circuitry 2 is provided. In these cases, processing circuitry 2 may be used to analyze images of more than one machine and optionally use information derived from one machine to analyze images of other machines. In another alternative, the processing may be split between processing circuitry within the monitored machine and additional circuitry outside the machine.

FIG. 1C is a simplified block diagram of a system for monitoring a mechanism or a component thereof, according to an exemplary embodiment of the invention.

Types of mechanisms which may be monitored by system 100 may include but are not limited to any type of mechanism that moves from one state to another, such as for example: a landing gear, a mechanism of a landing gear, a component of a landing gear, two or more components of a landing gear, independent components of a landing gear, interconnected components of a landing gear, or any combination thereof.

According to some embodiments, the system 100 may include one or more optical sensors 112 configured to be fixed on or in vicinity of the mechanism or the component thereof. According to some embodiments, the system 100 may be configured to monitor the mechanism and/or component thereof in real time. According to some embodiments, the system 100 may include at least one processor 102 in communication with the one or more optical sensors 112. According to some embodiments, the processor(s) 102 may be configured to receive signals (or data) from the one or more optical sensors 112. According to some embodiments, the processor(s) 102 may include an embedded processor, a cloud computing system, or any combination thereof. According to some embodiments, the processor(s) 102 may be configured to process the signals (or data) received from the one or more optical sensors 112 (also referred to herein as the received signals or the received data). According to some embodiments, the processor(s) 102 may include image processor 106 configured to process the signals received from the one or more optical sensors 112.

According to some embodiments, the one or more optical sensors 112 may be configured to detect light reflected from the surface of the mechanism and/or component thereof. This may be advantageous since surfaces with different textures reflect light differently. For example, a matt surface may be less reflective and may scatter (diffuse) light equally in all directions, in comparison with a polished surface, that would reflect more light than an unpolished one, because it has an even surface and reflects most of the light rays parallel to each other. A polished surface, being smooth and lustrous, may absorb a very little amount of light and may reflect more light, thereby the image detected from light that reflects from a polished surface may be clearer than an image detected from light reflected off an unpolished surface. Thus, the surface texture of a fracture, crack or any other surface defect may be different from the un-damaged surface surrounding it (or in other words, the original base-line surface), therefore the different light reflections from the surfaces allow the detection of small defects. Moreover, by changing the wavelengths, intensity, and/or directions of the light source of the system, this phenomenon can be intensified. According to some embodiments, and as described in greater detail elsewhere herein, the system may include one or more light sources configured to illuminate the mechanism and/or a component thereof.

According to some embodiments, changing the direction of the light may include moving the light sources. According to some embodiments, changing the direction of the light may include maintaining the position of two or more light sources fixed, while powering (or operating) the light sources at different times, thereby changing the direction of the light that illuminates the mechanism and/or component thereof. According to some embodiments, and as described in greater detail elsewhere herein, the system may include one or more light sources positioned such that operation thereof illuminates the mechanism and/or component thereof. According to some embodiments, the system may include a plurality of light sources, wherein each light source is positioned at a different location in relation to the mechanism and/or component thereof.

According to some embodiments, the wavelengths, intensity and/or directions of the one or more light sources may be controlled by the processor. According to some embodiments, changing the wavelengths, intensity and/or directions of the one or more light sources thereby enables the detection of surface defects on the surface of the mechanism and/or component thereof. According to some embodiments, the one or more optical sensors 112 may enable the detection, by analyzing the reflected light, of microscopic dents and/or defects, such as, for example, 2-3 tenths of a millimeter, which may be invisible to the naked eye.

According to some embodiments, the one or more optical sensors 112 may include a camera. According to some embodiments, the one or more optical sensors 112 may include an electro-optical sensor. According to some embodiments, the one or more optical sensors 112 may include any one or more of a charge-coupled device (CCD) and a complementary metal-oxide-semiconductor (CMOS) sensor (or an active-pixel sensor), or any combination thereof. According to some embodiments, the one or more optical sensors 112 may include any one or more of a point sensor, a distributed sensor, an extrinsic sensor, an intrinsic sensor, a through beam sensor, a diffuse reflective sensor, a retro-reflective sensor, or any combination thereof.

According to some embodiments, the one or more optical sensors may include one or more lenses and/or a fiber optic sensor. According to some embodiments, the one or more optical sensor may include a software correction matrix configured to generate an image from the obtained data. According to some embodiments, the one or more optical sensors may include a focus sensor configured to enable the optical sensor to detect changes in the obtained data. According to some embodiments, the focus sensor may be configured to enable the optical sensor to detect changes in one or more pixels of the obtained signals.

According to some embodiments, the system 100 may include one or more interfaces 114 in communication with the processor(s) 102.

According to some embodiments, interface 114 may be configured for receiving data from a user, wherein the data is associated with any one or more of the mechanism or the component thereof, the type of mechanism, the type of system in which the mechanism operates, the mode(s) of operation of a mechanism, the user(s) of the mechanism, one or more environmental parameters, one or more modes of failure of the mechanism, or any combination thereof.

According to some embodiments, the user interface 114 may include any one or more of a keyboard, a display, a touchscreen, a mouse, one or more buttons, or any combination thereof. According to some embodiments, the user interface 114 may include a configuration file which may be generated automatically and/or manually by a user. According to some embodiments, the configuration file may be configured to identify the at least one segment. According to some embodiments, the configuration file may be configured to enable a user to mark and/or select the at least one segment.

According to some embodiments, the system 100 may include memory 104 configured to store data and/or instructions (or code) for the processor(s) 102 to execute. According to some embodiments, memory 104 may be in communication (or operable communication) with the processor(s) 102. According to some embodiments, memory 104 may include a database 108 configured to store data associated with any one or more of the system 100, the mechanism or the component thereof, user inputted data, one or more training sets (or data sets used for training one or more of the algorithms), or any combination thereof. According to some embodiments, memory 104 may include one or more models and/or algorithms 110 stored thereon and configured to be executed by the processor(s) 102. According to some embodiments, the one or more models and/or algorithms 110 may be configured to analyze and/or classify the received signals, as described in greater detail elsewhere herein. According to some embodiments, and as described in greater detail elsewhere herein, the one or more models and/or algorithms 110 may include one or more preprocessing techniques for preprocessing the received signals. According to some embodiments, the models are trained using machine learning supervised or unsupervised learning techniques.

According to some embodiments, the one or more algorithms 110 may include a change detection algorithm configured to identify a change in the received signals. According to some embodiments, the one or more algorithms 110 and/or the change detection algorithm may be configured to receive signals from the one or more optical sensors 112, obtain data associated with characteristics of at least one mode of failure of the mechanism or the component thereof, and/or identify at least one change in the received signals.

According to some embodiments, the one or more algorithms 110 may include a classification algorithm configured to classify the identified change. According to some embodiments, the classification algorithm may be configured to classify the identified change as a fault and optionally the severity of the fault. According to some embodiments, the classification algorithm may be configured to classify the identified change as a normal performance (or motion) of the mechanism or the component thereof.

According to some embodiments, the one or more algorithms 110 may be configured to analyze the fault (or the identified change classified as a fault). According to some embodiments, the one or more algorithms 110 may be configured to output a signal (or alarm) indicative of the identified change being associated with the mode of failure.

According to some embodiments, the one or more algorithms 110 may be configured to execute, via the processor(s) 102, the method for monitoring potential failure in a landing gear or a component thereof, such as the method depicted in FIG. 4.

Reference Points

FIGS. 2A, 2C and 2E illustrate side views of three exemplary states of mechanism 2. In this example there are five reference points, P1-P5, on mechanism 5. FIG. 2B shows the alignment of reference points P1-P5 when mechanism 2 is in the first state. FIG. 2D shows the alignment of reference points P1-P5 when mechanism 2 is in the second state. FIG. 2F shows the alignment of reference points P1-P5 when mechanism 2 is in the third state.

As can be seen in FIGS. 2B, 2D and 2F, reference points P1-P5 align differently for each state. Thus the alignment of the reference point may be used to determine what state the mechanism is in and/or if the mechanism is not in a defined state.

FIG. 2G shows the alignment of reference points P1-P5 in state 1, with the addition of dashed lines showing the angles and distances between the reference points.

FIG. 2H is a shrunken version of FIG. 2G. It is noted that despite the change in image size, the angles and relative distances between the reference points remain the same.

Figure 3A:
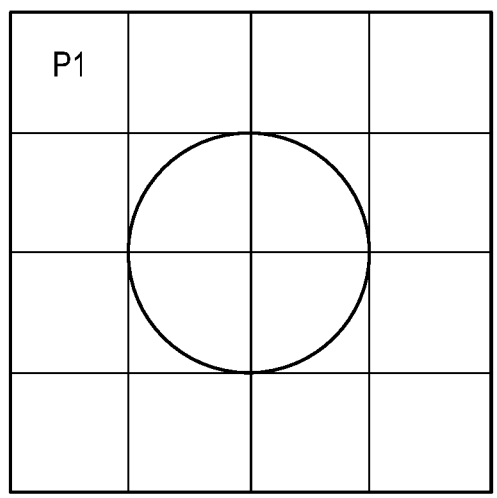
Figure 3B:
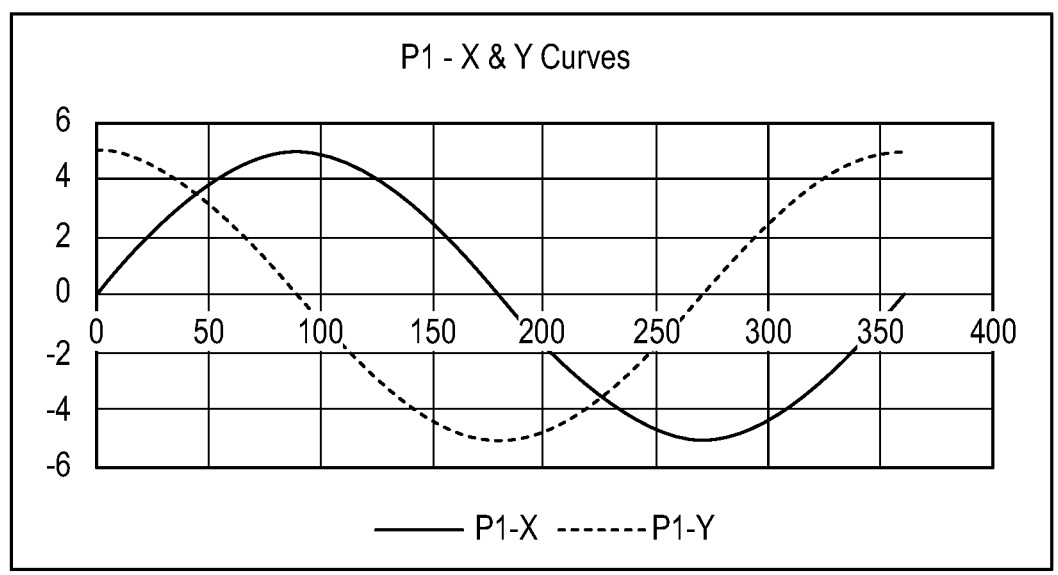

FIGS. 3A-3F, which show trajectories of the motion of reference points P1-P5 during proper operation of the mechanism. As can be seen from FIG. 3A, reference point P1 moves along a circular curve. FIG. 3B shows the location of reference point P1 as curves in the x and y axes and a permitted deviation from the curves.

Figure 3C:
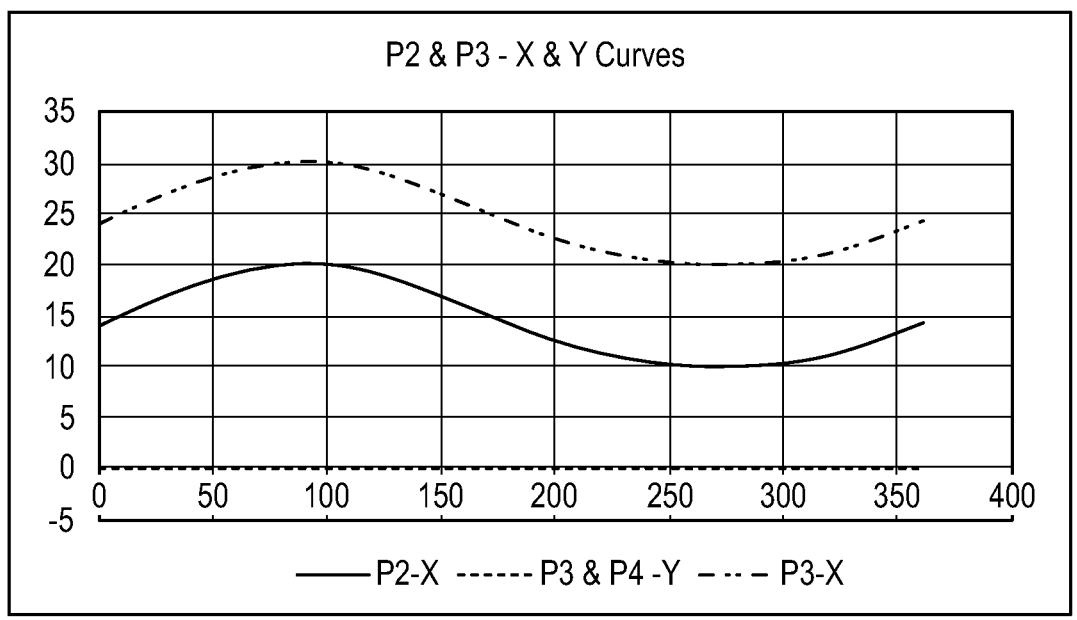

Reference points P2 and P3 move along a linear horizontal trajectory during proper operation, and their curves in the x and y axes are shown in FIG. 3C.

Figure 3D:
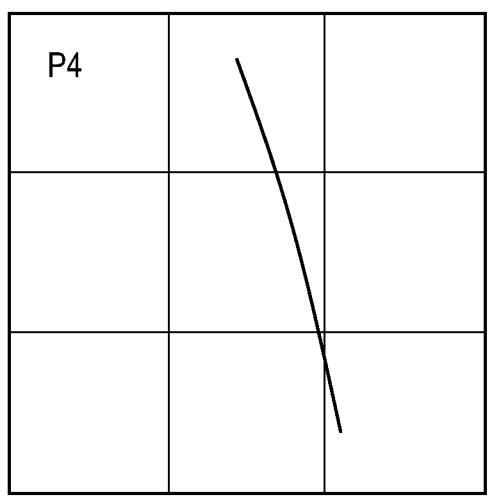
Figure 3E:
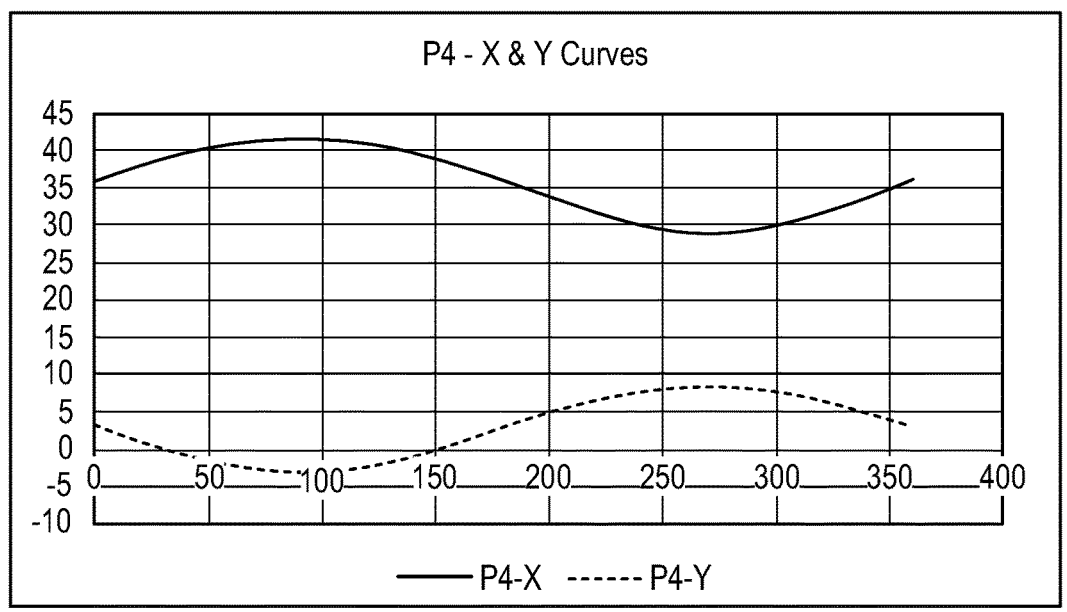

Reference point P4 moves along the curve depicted in FIG. 3D during proper operation, and its curve in x and y axes and a permitted deviation from the curves are presented in FIG. 3E.

Figure 3F:
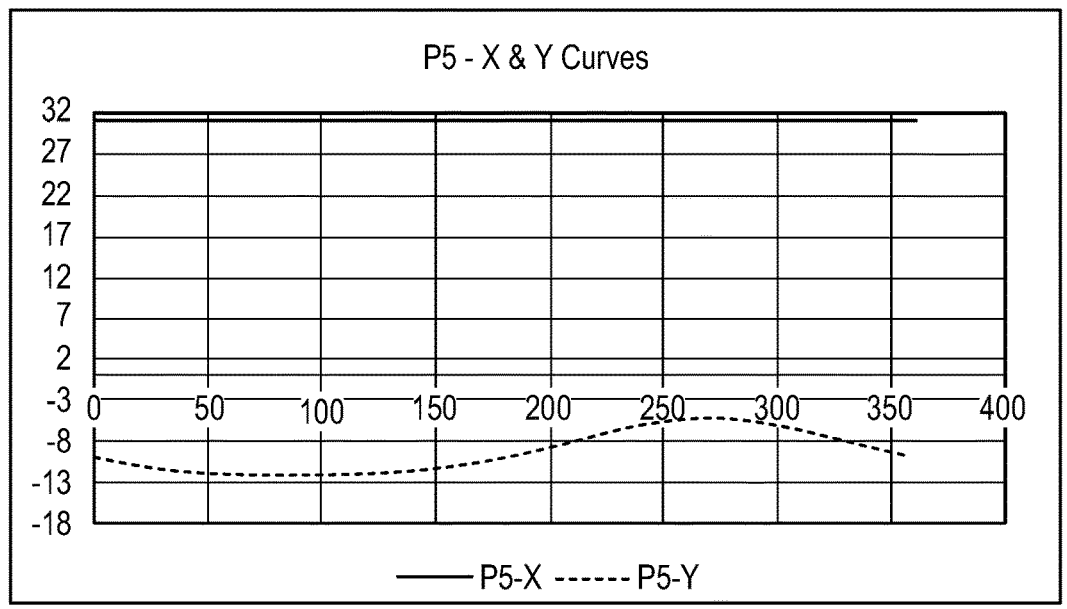

Reference point P5 moves along a linear vertical line, and its curves in x and y axes and permitted deviation from the curves are presented in FIG. 3F.

According to some embodiments the alignments and/or trajectories of reference points on the components, such as those shown in FIGS. 2A-2H and FIGS. 3A-3F may be used to monitor the alignments of the components themselves. Optionally, a deviation of a reference point that is greater than the permitted deviation from the defined curves is construed as an indication of a problem in the health of the mechanism.

Monitoring and Analysis of Potential Failure of a Mechanism

According to some embodiments, there is provided a system for monitoring potential failure in a mechanism or a component thereof.

In some embodiments the mechanism is the subsystem of a vehicle. In further embodiments the subsystem is configured to support the body of the vehicle at least during the locked state, for example an automobile suspension which connects the automobile chassis to the wheels, thereby supporting the automobile on the ground. In yet further embodiments, the mechanism is the landing gear of an aircraft or a spacecraft.

According to some embodiments, the system may be configured to receive signals from the at least one optical sensor positioned on or in vicinity of the landing gear or the component thereof, and receive signals therefrom. According to some embodiments, the system may be configured to identify at least one change in the received signals. According to some embodiments, for an identified change in the received signals, the system may be configured to apply the at least one identified change to an algorithm configured to analyze the identified change in the received signals and to classify whether the identified change in the received signals is associated with a mode of failure of the landing gear or the component thereof, thereby labeling the identified change as a fault, based, at least in part, on obtained data associated with a failure mode of the landing gear and/or component thereof. According to some embodiments, for an identified change that is classified as being associated with a mode of failure, the system may output a signal indicative of the identified change associated with the mode of failure.

According to some embodiments, the system may be configured to generate at least one model of a trend in the identified fault, wherein the trend may include a rate of change in the fault.

According to some embodiments, the system may be configured to prevent failure of a landing gear and/or components thereof by identifying a fault in real time and monitoring the changes of the fault in real time.

Reference is made to FIG. 4, which shows a flowchart of functional steps in a computer implemented method for monitoring potential failure in a mechanism or a component thereof, in accordance with some embodiments of the present invention, and to FIG. 5, which shows a schematic block diagram of a method for monitoring potential failure in a mechanism or a component thereof, in accordance with some embodiments of the present invention. According to some embodiments, the method 200 of FIG. 4 may include one or more steps of the block diagram 300 of FIG. 5.

According to some embodiments, at step 202, the method may include identifying at least one change in the received signals. According to some embodiments, at step 204, the method may include identifying at least one change in the received signals. According to some embodiments, at step 206, the method may include analyzing the identified change in the received signals and classifying whether the identified change in the received signals is associated with a mode of failure of the mechanism or the component thereof, thereby labeling the identified change as a fault. In some embodiments, the mechanism or component thereof is associated with one or more predefined mode of failures provided by the manufacturer thereof and/or the user and/or by monitoring and/or machine learning of same or similar components.

According to some embodiments, at step 208, the method may include outputting a signal indicative of the identified change associated with the mode of failure. According to some embodiments, at step 210, the method may include generating at least one model of a trend in the identified fault. According to some embodiments, at step 212, the method may include alerting a user of a predicted failure based, at least in part, on the generated model.

According to some embodiments, such as depicted in FIG. 5, the method may include signal acquisition 302, or in other words, receiving one or more signals. According to some embodiments, the method may include receiving one or more signals from at least one optical sensor fixed on or in vicinity of the mechanism or the component thereof, such as, for example, one or more sensors 112 of system 100. According to some embodiments, the one or more signals may include one or more images. According to some embodiments, the one or more signals may include one or more portions of an image. According to some embodiments, the one or more signals may include a set of images, such as a packet of images. According to some embodiments, the one or more signals may include one or more videos.

According to some embodiments, the method may include preprocessing (304) the one or more signals. According to some embodiments, the preprocessing may include converting the one or more signals into electronic signals (e.g., from optical signals to electrical signals). According to some embodiments, the preprocessing may include generating one or more images, the one or more sets of images, and/or one or more videos, from the one or more signals. According to some embodiments, the preprocessing may include dividing the one or more images, one or more portions of the one or more images, one or more sets of images, and/or one or more videos, into a plurality of tiles. According to some embodiments, the preprocessing may include applying one or more filters to the one or more images, one or more portions of the one or more images, one or more sets of images, one or more videos, and/or a plurality of tiles. According to some embodiments, the one or more filters may include one or more noise reduction filters.

According to some embodiments, the method may include putting together (or stitching) a plurality of signals obtained from two or more optical sensors. According to some embodiments, the method may include stitching a plurality of signals in real time.

According to some embodiments, the method may include identifying at least one segment within any one or more of the received signals, one or more images, one or more portions of the one or more images, one or more sets of images, and/or one or more videos. According to some embodiments, the method may include monitoring the (identified) at least one segment. According to some embodiments, the at least one change in the signals is a change within the at least one segment. According to some embodiments, the at least one change in the one or more images, one or more portions of the one or more images, one or more sets of images, and/or one or more videos, is a change within the at least one segment.

According to some embodiments, the user may mark a segment to be monitored onto an image and/or a portion of an image and/or at least a portion of a video. According to some embodiments, the user may input a location to be monitored. According to some embodiments, the algorithm may be configured to identify at least one segment within the location that the user inputted.

According to some embodiments, the method may include applying the one or more signals, the one or more images, the one or more portions of the one or more images, the one or more sets of images, and/or the one or more videos, to a change detection algorithm 308 (such as, for example, one or more algorithms 110 of system 100) configured to detect a change therein. According to some embodiments, the change detection algorithm may include one or more learning models 322 of the mechanism (e.g., landing gear).

According to some embodiments, the method may include detecting if there is a change in the shape of the at least one segment, size of the at least one segment, rate of occurrence of the at least one segment in the received signals, or any combination thereof. According to some embodiments, the method may include detecting if there is a change in the shape, size, and/or rate of occurrence, of the at least one segment, throughout time. According to some embodiments, the method may include detecting if there is a change in the shape, size, and/or rate of occurrence of the at least one segment, throughout a specified time period, such as, for example, a second, a few seconds, a minute, an hour, a day, a week, a few weeks, or any range therebetween.

According to some embodiments, the at least one segment may include a potential fault that needs to be monitored, such as, for example, a surface defect or a screw that may loosen. According to some embodiments, the at least one segment may include an outline of a byproduct of the mechanism or the component thereof, such as, for example, a fluid that may leak or a spark igniting a fire. According to some embodiments, the at least one segment may include the boundaries of a surface defect. According to some embodiments, the at least one segment may include the boundaries of at least one of a perimeter of a puddle, a perimeter of a droplet, a perimeter of a saturated area (or material), or any combination thereof. According to some embodiments, the at least one segment may include the boundaries of a spark.

According to some embodiments, the at least one segment may include the boundaries of a specific element of the mechanism or the component thereof. According to some embodiments, the method may include identifying a geometrical shape of the at least one segment as the specific element of the mechanism or the component thereof. According to some embodiments, the specific element may include any one or more of a screw, a connector, a bolt, a brake pad, one or more vehicles components, one or more fuel tanks, oil tanks, motors, gear box, turbine components, cables, belts, wires, fasteners, cylinders, blades, nuts, one or more flexible, semi-rigid, or rigid pipes/tubes, and any combination thereof. According to some embodiments, the method (or the identifying of the geometrical shape) may include analyzing any one or more of the total intensity, variance intensity, spackle detection, line segment detection, line segment registration, edge segment curvature estimation, homography estimation, specific object identification, object detection, semantic segmentation, background model, change detection, detection over optical flow, or reflection detection, flame detection, or any combination thereof.

According to some embodiments, the method may include obtaining data associated with characteristics of at least one mode of failure of the mechanism or the component thereof, or mode of failure identification 306. According to some embodiments, data associated with characteristics of at least one mode of failure of the mechanism or the component thereof may include a type of mode of failure. According to some embodiments, data associated with characteristics of at least one mode of failure of the mechanism or the component thereof may include a location or range of locations of the mode of failure on the mechanism or the component thereof and/or a specific type of mode of failure.

According to some embodiments, the mode of failure may include one or more aspects which may fail in the mechanism or the component thereof. According to some embodiments, and as described in greater detail herein, the mode of failure may include a critical development of an identified fault. According to some embodiments, the mode of failure may include any one of or more of a change in dimension, a change in position, a change in color, a change in texture, a change in size, a change in appearance, a fracture, a structural damage, a crack, crack size, critical crack size, crack location, crack propagation, a specified pressure applied to the mechanism or the component thereof, a change in the movement of one component in relation to another component, defect diameter, cut, warping, inflation, deformation, abrasion, wear, corrosion, oxidation, sparks, smoke, an amount of leakage, a rate of leakage, change in rate of leakage, amount of accumulated liquid, a change in the amount of accumulated liquid size of formed bubbles, drops, puddles, puddle forming, puddle propagation, jets, fluid flow rate, drop size, fluid volume, rate of accumulation of liquid, change in color/shade, a change in dimension, a change in position, a change in color, change in size, a change in appearance, or any combination thereof.

According to some embodiments, the method may include obtaining data associated with characteristics of at least one mode of failure of the machine or the component thereof by receiving user input. According to some embodiments, the method may include obtaining data associated with characteristics of at least one mode of failure of the mechanism or the component thereof by analyzing the received signals and detecting at least one segment that is associated with a mode of failure. According to some embodiments, the method may include obtaining data associated with characteristics of at least one mode of failure of the mechanism or the component thereof by analyzing the received signals and detecting potential modes of failure. According to some embodiments, the method may include obtaining data associated with characteristics of at least one mode of failure of the mechanism or the component thereof by analyzing the received signals and detecting one or more modes of failure which were previously unknown.

According to some embodiments, obtaining data associated with characteristics of at least one mode of failure of the mechanism or the component thereof includes receiving inputted data from a user. According to some embodiments, the user may input data associated with the mode of failure of the mechanism or the component thereof using a user interface. According to some embodiments, the method may include monitoring the mechanism and/or component thereof based, at least in part, on the received inputted data from the user. According to some embodiments, the user may input the type of failure mode of the mechanism and/or the component of the mechanism. According to some embodiments, the user may input the type of failure mode associated with a specific identified segment. According to some embodiments, the user may input the location of the failure mode. According to some embodiments, the user may identify one or more of the at least one segments as being in a location likely to fail and/or develop a fault.

According to some embodiments, the method may include automatically obtaining data associated with characteristics of at least one mode of failure of the mechanism or the component thereof. According to some embodiments, the method may include obtaining data associated with characteristics of at least one mode of failure of the mechanism or the component thereof without user input. According to some embodiments, the method may include analyzing the received signal and automatically retrieving the data from a database, such as, for example, database 108. According to some embodiments, the one or more algorithms may be configured to identify one or more modes of failure, within the database, which may be associated with the identified segment of the received signals of the mechanism and/or component thereof. According to some embodiments, the method may include searching the database for possible failure modes of the identified segment. According to some embodiments, the method may include retrieving data, from the database, wherein the data is associated with possible failure modes of the identified segment.

According to some embodiments, the method may include obtaining data associated with characteristics of at least one mode of failure of the mechanism or the component thereof by identifying a previously unknown failure mode. According to some embodiments, identifying a previously unknown failure mode may include applying the received signals and/or the identified segment to a mechanism learning algorithm 324 configured to determine a mode of failure of the mechanism or the component thereof. According to some embodiments, the mechanism learning algorithm 324 may be trained to identify a potential failure mode of the identified segment.

According to some embodiments, at step 204, the method may include identifying at least one change in the received signals and/or the at least one identified segment. According to some embodiments, the method may include applying the received signals and/or the at least one identified segment to a change detection algorithm such as for example, change detection algorithm 308, configured to detect (or identify) at least one change in the received signals and/or the at least one identified segment.

According to some embodiments, identifying at least one change in the signals includes identifying a change in the rate of change in the signals. For example, the algorithm may be configured to identify a change that occurs periodically within the analyzed signals, then the analyzed signals may "return" to the previous state (e.g., prior to the change in the analyzed signals). According to some embodiments, the algorithm may be configured to identify a change in the rate of occurrence of the identified change.

According to some embodiments, the term "analyzed signals" as used herein may describe any one or more of the received signals, such as raw signals from the one or more optical sensor, processed or preprocessed signals from the one or more optical sensor, one or more images, one or more packets of images, one or more portions of one or more images, one or more videos, one or more portions of one or more videos, at least one identified segment, at least a portion of an identified segment, or any combination thereof. According to some embodiments, identifying the at least one change in the analyzed signals may include analyzing raw data of the received signals.

According to some embodiments, the change detection algorithm 308 may include any one or more of a binary change detection, a quantitative change detection, and a qualitative change detection.

According to some embodiments, the binary change detection may include an algorithm configured to classify the analyzed signals as having a change or not having a change. According to some embodiments, the binary change detection may include an algorithm configured to compare two or more of the analyzed signals. According to some embodiments, for a comparison that shows the compared analyzed signals are the same, or essentially the same, the classifier labels the analyzed signals as having no detected (or identified) change. According to some embodiments, for a comparison that shows the compared analyzed signals are different, the classifier labels the analyzed signals as having a detected (or identified) change. According to some embodiments, two or more analyzed signals that are different may have at least one pixel that is different. According to some embodiments, two or more analyzed signals that are the same may have identical characteristics and/or pixels. According to some embodiments, the algorithm may be configured to set a threshold number of different pixels above which two analyzed signals may be considered as different.

Advantageously, the change detection algorithm 308 enables fast detection of changes in the analyzed signaling and may be very sensitive to the slightest changes therein. Even more so, the detection and warning of the binary change detection may take place within a single signal, e.g., within a few milliseconds, depending on the signal outputting rate of the optical sensor, or for an optical sensor comprising a camera, a within a single image frame, e.g., within a few milliseconds, depending on the frame rate of the camera.

According to some embodiments, the binary change detection algorithm may, for example, analyze the analyzed signals and determine if a non-black pixel changes to black over time, thereby indicating a possible change in the position of the mechanism or component thereof, perhaps due to deformation or due to a change in the position of other components of the mechanism. According to some embodiments, if the binary change detection algorithm detects a change in the signals, a warning signal (or alarm) may be generated in order to alert the equipment or a technician that maintenance may be required.

According to some embodiments, the binary change detection algorithm may be configured to determine the cause of the identified change using one or more mechanism learning models. According to some embodiments, the method may include determining the cause of the identified change by applying the identified change to a mechanism learning algorithm. For example, for a black pixel that may change over time (or throughout consecutive analyzed signals) to a color other than black, the mechanism learning algorithm may output that the change is indicative of a change in the material of the mechanism or component thereof, for example, due to overheating. According to some embodiments, the method may include generating a signal, such as an informational signal or a warning signal, if necessary. According to some embodiments, the warning signal may be a one-time signal or a continuous signal, for example, that might require some form of action in order to reset the warning signal.

According to some embodiments, the method may include identifying the at least one change in the signals by analyzing dynamic movement of the mechanism or the component thereof. According to some embodiments, the dynamic movement may include any one or more of linear movement, rotational movement, periodic (repetitive) movement, damage, defect, crack size/length, crack growth rate, crack propagation, fracture, structural damage, defect diameter, cut, warping, inflation, deformation, abrasion, wear, corrosion, oxidation, sparks, smoke, fluid flow rate, drop size, fluid volume, rate of accumulation of liquid, change in texture, change in color/shade, size of formed bubbles, drops, puddle forming, puddle propagation, a change in dimension, a change in position, a change in color, a change in texture, change in size, a change in appearance, or any combination thereof.

According to some embodiments, the change detection may include a quantitative change detection. According to some embodiments, the quantitative change detection may include an algorithm configured to determining whether a magnitude of change above a certain threshold has occurred in the analyzed signals. According to some embodiments, the magnitude of change above a certain threshold may include a cumulative change in magnitude regardless of time, and/or a rate (or rates) of change in magnitude. For example, the value reflecting a change in magnitude may represent a number of pixels that have changed, a percentage of pixels that have changed, a total difference in the numerical values of one or more pixels within the field of view (or the analyzed signals), combinations thereof and the like. According to some embodiments, the quantitative change detection algorithm may output quantitative data associated with the change in the analyzed signals.

According to some embodiments, the change detection may include a qualitative change detection algorithm. According to some embodiments, the qualitative change detection algorithm may include an algorithm configured to classify the analyzed signals as depicting a change in the mechanism and/or component thereof. According to some embodiments, the qualitative change detection algorithm may include a mechanism learning model configured to receive the analyzed signals and to classify the analyzed signals into categories including at least: including a change in the behavior of the mechanism or component thereof, and not including a change in the behavior of the mechanism or component thereof.

According to some embodiments, the change detection algorithm may be configured to analyze, with the assistance of a mechanism learning model, other more complex changes in the analyzed signals generated by the optical sensors. According to some embodiments, the mechanism learning model may be trained to recognize complex, varied changes. According to some embodiments, the mechanism learning model may be able to identify complex changes, such as, for example, for signals generated by the optical sensors that may begin to exhibit some periodic instability, such that the signals can appear normal for a time, and then abnormal for a time before appearing normal once again. Subsequently, the signals may exhibit some abnormality that is similar but different than before, and the change detection algorithm may be configured to analyze changes and, over time, train itself to detect the likely cause of the instability. According to some embodiments, the change detection algorithm may be configured to generate a warning signal or an informational signal, if necessary, for a user to notice the changes in the machine and/or the component thereof.

Reference is made to FIG. 6, which shows an exemplary schematic block diagram of the system for monitoring potential failure in a mechanism or a component thereof, in accordance with some embodiments of the present invention, and to FIG. 7, which shows an exemplary schematic block diagram of the system for monitoring potential failure in a mechanism or a component thereof in communication with a cloud storage module, in accordance with some embodiments of the present invention.

As depicted in the exemplary systems of FIG. 6 and FIG. 7, the optical sensor may receive one or more signals from the mechanism and/or component thereof, such as, for example, the mechanism 502. According to some embodiments, the optical sensor may generate signals, such as, for example, images or video, and send the generated signals to an image processor 506. According to some embodiments, the image processor processes the signals generated by the optical sensor (e.g. optical sensor(s) 504 of FIG. 6 and FIG. 7), such that the data can be analyzed by the data analysis module 518 (or algorithms as described herein). According to some embodiments, the image processor 506 may include any one or more of an image/frame acquisition module 508, a frame rate control module 510, an exposure control module 512, a noise reduction module 514, a color correction module 516, and the like. According to some embodiments, the data analysis module (or algorithms as described herein) may include the change detection algorithm such as for example, change detection algorithm 308. According to some embodiments, the user interface module 532 (described below) may issue any warning signals resulting from the signal analysis performed by the algorithms. According to some embodiments, any one or more of the signals, and/or the algorithms, may be stored on a cloud storage 602. According to some embodiments, the processor may be located on a cloud, such as, for example, cloud computing 604, which may co-exist with an embedded processor.

According to some embodiments, the data analyzing module 518 may include any one or more of a binary (visual) change detector 520 (or binary change detection algorithm as described in greater detail elsewhere herein), quantitative (visual) change detector 522 (or quantitative change detection algorithm as described in greater detail elsewhere herein), and/or a qualitative (visual) change detector 524 (or qualitative change detection algorithm as described in greater detail elsewhere herein). According to some embodiments, the qualitative (visual) change detector 524 may include any one or more of edge detection 526 and/or shape (deformation) detection 528. According to some embodiments, the data analyzing module 518 may include and/or be in communication with the user interface module 532. According to some embodiments, and as described in greater detail elsewhere herein, the user interface module 532 may include a monitor 534. According to some embodiments, the user interface module 532 may be configured to output the alarms and/or notifications 536/326.

According to some embodiments, the change detection algorithm such as for example, change detection algorithm 308, may be implemented on an embedded processor, or a processor in the vicinity of the optical sensor. Thus, the change detection algorithm such as for example, change detection algorithm 308, may enable a quick detection and prevent lag time associated with sending data to a remote server (such as a cloud).

According to some embodiments, once a change is identified using the change detection algorithm, the identified change may be classified using a classification algorithm. According to some embodiments, at step 206, the method may include analyzing the identified change in the received signals (or the analyzed signals) and classifying whether the identified change in the received signals is associated with a mode of failure of the machine or the component thereof, thereby labeling the identified change as a fault. According to some embodiments, the method may include applying the received signals (or the analyzed signals) to an algorithm configured to analyze the identified change in the received signals and to classify whether the identified change in the received signals is associated with a mode of failure of the mechanism or the component thereof based, at least in part, on the obtained data.

According to some embodiments, the method may include applying the identified change to an algorithm configured to match between the identified change and the obtained data associated with the mode of failure. According to some embodiments, the algorithm may be configured to determine whether the identified change may potentially develop into one or more modes of failure. According to some embodiments, the algorithm may be configured to determine whether the identified change may potentially develop into one or more modes of failure based, at least in part, on the obtained data. According to some embodiments, the method may include labeling the identified change as a fault if the algorithm determines that that identified change may potentially develop into one or more modes of failure.

For example, an identified change of a surface defect and/or crack may be identified as a fault once the crack or defect reaches a certain size or length and may be associated with a mode of failure that is a critical crack size or critical defect size.

For example, in an identified change of an increase in the rate of drops formed at the bottom portion of a pipe, a fault may be identified as a leak, and the mode of failure may be a predetermined rate of drops formed at the bottom portion of the pipe.

For example, where an identified change may include a texture or color of a component of the mechanism, the fault may be identified as corrosion, and the mode of failure may be an amount of corrosion or depth of corrosion within the component.

According to some embodiments, the fault may include any one or more of structural damage, a crack, a defect, a predetermined crack size and/or length, crack growth rate, crack propagation, fracture, defect diameter, cut, warping, inflation, deformation, abrasion, wear, corrosion, oxidation, sparks, smoke, fluid flow rate, drop formation, drop size, fluid or drop volume, rate of drop formation, rate of accumulation of liquid, change in texture, change in color/shade, size of formed bubbles, puddle forming, puddle propagation, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, or any combination thereof.

According to some embodiments, the algorithm may identify the fault using one or more machine learning models. According to some embodiments, and as described in greater detail elsewhere herein, the machine learning model may be trained over time to identify one or more faults. According to some embodiments, the machine learning models may be trained to identify previously unknown faults by analyzing a baseline behavior of the machine and/or component thereof.

Advantageously, identifying the fault using a machine learning model enables the detection of different types of faults, or even similar faults that may appear different in different machinery or situations, or even different angles of the optical sensors. Thus, the machine learning model may increase the sensitivity of the detection of the one or more faults.

According to some embodiments, the system and/or the one or more algorithms may include one or more suppressor algorithms 310 (also referred to herein as suppressors 310) for reducing the number of false alarms provided by the system. According to some embodiments, the one or more suppressor algorithms may be configured to classify the whether the detected fault may develop into a failure or not, such as depicted by the mode of failure junction 312 of FIG. 5. For example, suppressor 310 may indicate that the detected fault is a result of dirt or insect on the optical lens of the sensor or on the images components and is therefore not associated with a mode of failure associated with the component. The suppressor will thus filter identified faults that are not associated with predefined modes of failures to reduce the number of false alarms provided by the system.

According to some embodiments, the one or more suppressor algorithms 310 may include one or more machine learning models 320. According to some embodiments, the one or more suppressor algorithms 310 may classify a fault and/or a propagating fault as harmless.

According to some embodiments, at step 208, for an identified fault, the method may include outputting a signal, such as a warning signal, indicative of the identified change being associated with the mode of failure. According to some embodiments, the method may include storing the identified change in the database, thereby increasing the data set for training the one or more machine learning models.

According to some embodiments, the method may include labeling data associated with any one or more of the mode of failure identification 306, change detection algorithm 308, the suppressors 310, and the classification as depicted by the mode of failure junction 312. According to some embodiments, the method may include supervised labeling 316, such as manual labeling of the data using user input (or expert knowledge).

According to some embodiments, if the identified change is not classified as being associated with a mode of failure (such as depicted by arrow 350 of FIG. 5), it may be identified (or classified) as normal, or in other words, normal behavior or operation of the mechanism or component thereof. According to some embodiments, for an identified change classified as normal, the method may include storing data associated with the identified change, thereby adding the identified change to the database and increasing the data set for training 318 the one or more machine learning models (such as, for example, the one or more machine learning models 320/322/324). According to some embodiments, the method may include using data associated with the identified change for further investigation, wherein the further investigation includes at least one of adding a mode of failure, updating the algorithm configured to identify the change, and training the algorithm to ignore the identified change in the future, thereby improving the algorithm configured to identify the change.

According to some embodiments, if the identified change is classified as being associated with a mode of failure (such as depicted by arrow 355 of FIG. 5), the method may include trend analysis and failure prediction 314. According to some embodiments, at step 210, the method may include generating at least one model of a trend in the identified fault. According to some embodiments, the method may include generating at least one model of the trend based on a plurality of analyzed signals. According to some embodiments, the method may include generating at least one model of the trend by calculating the development of the identified change within the analyzed signals over time. According to some embodiments, the trend may include a rate of change of the fault. According to some embodiments, the method may include generating the at least one model of trend in the identified fault by calculating a correlation of the rate of change of the fault with one or more environmental parameters. According to some embodiments, the one or more environmental parameters may include any one or more of temperature, season or time of the year, pressure, time of day, hours of operation of the mechanism or the component thereof, duration of operation of the mechanism or the component thereof, an identified user of the mechanism (such as, for example, a specific pilot), GPS location (or location or country in the world), mode of operation of the mechanism or the component thereof, or any combination thereof.

According to some embodiments, the mode of operation of the mechanism may include any one or more of the distance the aircraft traveled or moved, the frequency of motion, the velocity of motion, the power consumption during operation, the changes in power consumption during operation, and the like. According to some embodiments, generating the at least one model of trend in the identified fault by calculating a correlation of the rate of change of the fault with one or more environmental parameters may include taking into account the different influences in the surrounding of the aircraft and/or component thereof. According to some embodiments, the method may include mapping the different environmental parameters affecting the operation of the mechanism and/or component, wherein the environmental parameters may vary over time.

According to some embodiments, at step 212, the method may include alerting a user of a predicted failure based, at least in part, on the generated model. According to some embodiments, the method may include outputting notifications and/or alerts 326 to the user. According to some embodiments, the method may include alerting a user of the predicted failure. According to some embodiments, the method may include alerting the user of a predicted failure by outputting any one or more of: a time (or range of times) of a predicted failure and characteristics of the mode of failure, or any combination thereof. According to some embodiments, the method may include outputting a prediction of when the identified fault is likely to lead to failure in the mechanism or the component thereof, based, at least in part, on the generated model. According to some embodiments, the predicting of when a failure is likely to occur in the mechanism or the component thereof may be based, at least in part, on known future environmental parameters. According to some embodiments, the predicting of when a failure is likely to occur in the mechanism or the component thereof may be based, at least in part, on a known schedule, such as, for example, a calendar.

According to some embodiments, the system for monitoring potential failure in a mechanism or a component thereof, such as, for example, system 100, may include one or more light sources configured to illuminate at least a portion of the vicinity of the mechanism or component thereof. According to some embodiments, the one or more light sources may include any one or more of a light bulb, light-emitting diode (LED), laser, a fiber light source, fiber optic cable, and the like. According to some embodiments, the user may input the location (or position) of the light source, the direction of illumination of the light source (or in other words, the direction at which the light is directed), the duration of illumination, the wavelength, the intensity, and/or the frequency of illumination of the light source in relation to the one or more optical sensor. According to some embodiments, the one or more algorithms may be configured to automatically locate the one or more light sources. According to some embodiments, the one or more algorithms may instruct the operation mode of the one or more light sources. According to some embodiments, the one or more algorithms may instruct and/or operate any one or more of the illumination intensities of the one or more light sources, the number of powered light sources, the position of the powered light sources, and the wavelength, the intensity, and/or the frequency of illumination of the one or more light sources, or any combination thereof.

Advantageously, an algorithm configured to instruct and/or operate the one or more light sources may increase the clarity of the received signals by reducing darker areas (such as, for example, areas from which light is not reflected and/or areas that were not illuminated) and may fix (or optimize) the saturation of the received signals (or images).

According to some embodiments, the one or more algorithms may be configured to detect and/or calculate the position in relation to the one or more optical sensors, the duration of illumination, the wavelength, the intensity, and/or the frequency of illumination of the one or more light sources. According to some embodiments, the one or more algorithms may be configured to detect and/or calculate the position in relation to the one or more optical sensors, the duration of illumination, the wavelength, the intensity, and/or the frequency of illumination of the one or more light sources based, at least in part, on the analyzed signals. According to some embodiments, the processor may control the operation of the one or more light sources. According to some embodiments, the processor may control any one or more of the duration of illumination, the wavelength, the intensity, and/or the frequency of illumination of the one or more light sources.

According to some embodiments, the method may include obtaining the position, the duration of illumination, the wavelength, the intensity, and/or the frequency of illumination, of the one or more light sources in relation to the one or more optical sensors. According to some embodiments, the method may include obtaining the position of the one or more light sources via any one or more of a user input, detection, and/or using the one or more algorithms. According to some embodiments, the method may include classifying whether the identified change in the (analyzed) signals is associated with a mode of failure of the mechanism or the component thereof is based, at least in part, on any one or more of the placement(s) of the at least one light source, the duration of illumination, the wavelength, the intensity, and the frequency of illumination.

According to some embodiments, the method may include outputting data associated with an optimal location for placement (or location) of the optical sensor, from which potential modes of failure can be detected. According to some embodiments, the one or more algorithms may be configured to calculate at least one optimal location for placement (or location) of the one or more optical sensor, based, at least in part, on the obtained data, data stored in the database, and/or user inputted data.

According to some embodiments, the light source may illuminate the mechanism and/or component thereof with one or more wavelengths from a wide spectrum range, visible and invisible. According to some embodiments, the light source may include a strobe light, or a light source configured to illuminate in short pulses. According to some embodiments, the light source may be configured to emit strobing light without use of global shutter sensors.

According to some embodiments, the wavelengths may include any one or more of light in the ultraviolet region, the infrared region, or a combination thereof. According to some embodiments, the one or more light sources may be mobile, or moveable. According to some embodiments, the one or more light sources may change the outputted wavelength during operation, change the direction of illumination during operation, change one or more lenses, and the like. According to some embodiments, the light source may be configured to change the lighting using one or more fiber optics (FO), such as, for example, by using different fibers to produce the light at different times, or by combining two or more fibers at once. According to some embodiments, the fiber optics may include one or more light sources attached thereto, such as, for example, an LED. According to some embodiments, the light intensity and/or wavelength of the LED may be changed, as described in greater detail elsewhere herein, using one or more algorithms.

Advantageously, illuminating the mechanism and/or component thereof may enable the optical sensor to detect faults and/or surface defects and/or structural defects by analyzing shadows and/or reflections. For example, a surface defect may generate a shadow that can be analyzed by the one or more algorithms and detected as a surface defect.

Advantageously, illuminating the mechanism and/or component thereof to detect surface defects while receiving the optical signals from the one or more optical sensors may enable detection of defects and/or faults that may not be visible to a human. According to some embodiments, the size of the defects and/or faults may range between 10 micrometers and 5 mm. According to some embodiments, the size of the defects and/or faults may be less than 10 micrometers.

Determining the State of a Mechanism

Reference is now made to FIG. 8A, which is a simplified flowchart of a method for detecting the state of a mechanism, according to some embodiments of the invention. Optionally, the method is implemented by any one of the systems shown in FIGS. 1A-1C, however another system may be used.

The mechanism includes multiple components, where at least some of the components are capable of moving relatively to each other. At least one state is defined for the mechanism. A state is defined by specifying the alignment of the mechanism components for the given state.

In 810, image data of components of the mechanism is input from at least one optical sensor. The image data is collected by the optical sensors during the operation of the mechanism.

In 820, reference points of at least two components capable of relative motion with each other are identified within the input image data. The reference points may be identified in the image data using any technique known in the art, including but not limited to image segmentation and other techniques described herein.

In 830, the respective locations of the reference points are used to determine whether the mechanism components are or are not in one of the alignments that is specified as a state (i.e. whether the mechanism is in a defined state or is stateless).

In 840, an indicator of a whether the mechanism is or is not in a defined state is output. When the mechanism has more than one state, the specified state may be indicated.

Optionally, an indicator signal is output only when the mechanism enters and exits a defined state and/or is currently in a defined state. Thus an analysis of the indicator signal may determine when the mechanism is not in a defined state (i.e. is stateless), even if an explicit indication of a stateless condition is not output.

Optionally, determining the state of the machine is additionally based on an analysis of respective trajectories of the reference points. For example, the analysis may track the reference points as they converge on a state and predict that the mechanism is entering a particular state.

Optionally, determining the state of a machine is based on a model. The model may be developed by any means known in the art.

Optionally, the model is a trained model developed using a machine learning technique (e.g. supervised or unsupervised learning). The model is trained using a training set of images collected during operation of the mechanism and/or a similar mechanism. Alternately or additionally, the model includes algorithms and/or rule-based decision making and/or mappings of proper reference point alignments and/or trajectories.

Optionally, the model is trained prior to actual use of the mechanism (e.g. during a preliminary training period).

Optionally, the model is periodically retrained based on image data collected actual use of the mechanism.

Optionally, at least one of the reference points is detected automatically when the model is trained and/or retrained. For example, areas of interest, such as moving components, may be emphasized during learning (possibly supervised), and features that may be used as reference points are identified within these areas by machine learning.

Optionally, the system is trained by being fed with labeled image data of healthy and unhealthy motion.

In some embodiments, a three-dimensional (3D) model of the mechanism is created by combining images of the mechanism, or components of the mechanism, taken from different directions. The 3D model enables the model to learn the motion(s) of the mechanism, and to decide which reference points to follow. Optionally the 3D model is also used to determine the preferred position of an optical sensor for monitoring the mechanism.

Optionally, at least one reference point is specified by an external source via an interface. Optionally, the reference point(s) are specified by a user through a GUI. Alternately or additionally, the reference point(s) are specified by an external mechanism and/or machine and/or system (e.g. over a network).

In some embodiments the mechanism is the subsystem of a vehicle. In further embodiments the subsystem is configured to support the body of the vehicle at least during the locked state.

Optionally, the mechanism is the landing gear of an aircraft or a spacecraft, and the method detects whether the landing gear is locked. This indicator may be very significant for safe operation of the aircraft, by warning that the aircraft should not land because the landing gear is unlocked.

Optionally, the method further includes analyzing the image data to detect and indicate touchdown of an aircraft. Touchdown may be detected by rapid movement of the mechanism from a defined state and/or into a different defined state due to the force exerted on the mechanism during landing.

Further optionally, the method detects, from the image data, a level of stress placed on the mechanism during operation. High stresses on the mechanism may lead to an increased need for maintenance or failure. Conversely, when the mechanism does not undergo high mechanical stresses, it may be able to postpone maintenance of the mechanism. Alternately or additionally, touchdown may be detected by one or more other types of sensors on the landing gear and/or by input from the control system of the aircraft.

Optionally, the stress on the mechanism may be evaluated by:

1) The respective motions of at least two reference points during operation. Unexpected rapid and/or large motions of a reference point may indicate that a large amount of force has been applied to the mechanism.
2) A deformation in a component of the mechanism. For example, a deformation may be detected when the distance between two reference points on the same component changes.

Optionally, the method detects hard landings of an aircraft based on images of components of the landing gear. Further optionally, the degree of hardness of the landing is based on:

1) Respective motions of at least two reference points on the landing gear during touchdown; and/or
2) Deformation of the landing gear wheel during touchdown.

Reference is now made to FIG. 8B, which is a simplified flowchart of a method for outputting an indicator of mechanism health, according to some embodiments of the present invention. FIG. 8B illustrates an exemplary embodiment of 840, as described above with respect to FIG. 8A.

In 841, the results of the determination of 830 of FIG. 8A are checked to detect if the mechanism is in one of the specified alignment(s). If yes, in 842 an indicator that the mechanism is in a predefined state is output. Optionally, when there are multiple predefined alignments the indicator includes which specific state the mechanism is in. If not, in 843 an indicator that the mechanism is not in a predefined state is output.

It is appreciated that touchdown as described with respect to FIGS. 8A-8B herein may also be combined with any of the descriptions with respect to the chapter "Determining locked position and detecting hard landings for a landing gear" hereinabove.

Reference is now made to FIGS. 9A-9B, which are simplified diagrams of a landing gear before and during touchdown respectively. Landing gear 900 has six reference points A1-A6. A4 rotates with the motion of the wheel. A1 and A3 move linearly relative to each other along axis 920. FIG. 9A shows the alignment of reference points A1-A6 before landing. As seen in FIG. 9B, during touchdown the alignment of reference points A1-A6 changes. For example, the distance between A1 and A3 shortens due to forces exerted on the shock absorber. The distance between A5 and A6 shortens, indicating a deformation of the wheel. The change in these distances may be used to determine how hard the landing was. A harder landing will cause a greater change in the distance between A1 and A3 and/or the deformation of wheel 910.

Optionally, the alignments and/or trajectories of the reference points are used to estimate the health and/or degree of wear of the mechanism. Optionally, the estimation is based on at least one factor including but not limited to:

1) The time it takes the mechanism to transition between states;
2) Changes in the trajectories of the reference points over;
3) Changes in the alignments of the reference points over time; and
4) Time(s) of deployment of the mechanism.

Optionally, the method further includes inputting the image data from at least one optical sensor. The optical sensor(s) are positioned to provide image data which may be analyzed to detect the reference points on the components.

Optionally, the state of the mechanism is determined based on additional data input from non-imaging sensors, such as pressure sensors and/or acoustic sensors and/or vibration sensors and/or temperature sensors. The pressure, temperature and other conditions under which the mechanism is operating may cause changes in the reference point alignment which may be compensated for when the conditions are known.

Monitoring the Health of a Mechanism

Reference is now made to FIG. 10, which is a simplified flowchart of a method for monitoring the health of a mechanism, according to some embodiments of the invention. Optionally, the method is implemented by any one of the systems shown in FIGS. 1A-1C, however another system may be used.

In 1010, image data of mechanism components is input from at least one optical sensor.

In 1020, the relative motions of reference points on at least two of the mechanism components are identified within the image data.

In 1030, the health of the mechanism is evaluated by analyzing the relative motions using a model of proper operation of the mechanism.

In 1040, an indicator of the health of the mechanism is output, where the indicator is based on the evaluation performed in 1030.

The model may be developed by any means known in the art.

Optionally, the model is a trained model developed using a machine learning technique (e.g. supervised or unsupervised learning). The model is trained using a training set of images collected during operation of the mechanism and/or a similar mechanism. Alternately or additionally, the model includes algorithms and/or rule-based decision making and/or mappings of proper reference point alignments and/or trajectories.

Optionally, the model is trained prior to actual use of the mechanism (e.g. during a preliminary training period).

Optionally, the model is periodically retrained based on image data collected actual use of the mechanism.

Optionally, the motion of at least one mechanism component is rotational and the motion of at least one mechanism component is linear. An example was shown in FIGS. 9A-9B.

Optionally, the analysis includes determining the alignment of the reference points when the reference points are static, and the indicator indicates whether the reference points are correctly or incorrectly aligned.

Optionally, the analysis includes comparing relative trajectories of the reference points to trajectories specified by the model, and the indicator includes an alert when the relative trajectories are outside a tolerance of the model.

Optionally, the images are analyzed to monitor the health of a single component of the mechanism, such as, for example, the loosening or rotation of a screw or rivet, rust or corrosion formation, tension of an elastic element, leaks, lubrication, crack and/or other wear of components.

Optionally, the analysis includes one or more of:
1) Estimating respective forces exerted on the mechanism components during operation of the mechanism from the relative motions of the reference points. The indicator indicates the estimated levels of force.
2) Detecting, from the image data, a deformation of a component of the mechanism during operation of the mechanism. The indicator indicates whether (and optionally to what degree) the component is distorted.
3) Monitoring a change in a shape of at least one mechanism component over time.
4) Detecting changes in the surface of a mechanism component, for example rusting, staining, indentations, breaks and cracks, etc.

Optionally, the method further includes inputting data from non-imaging sensors, such as acoustic sensors, vibration sensors or temperature sensors.

Optionally, in 1025 additional data which is indicative of the mechanism health (also denoted mechanism health-related data) and/or a trend of mode of failure for an identified fault is obtained. This information may include, but is not limited to, one or more of:
1) Respective forces exerted on at one or more of the mechanism components;
2) A defect in at least one of the mechanism components;
3) A deformation of at least one of the mechanism components;
4) A change in shape of at least one of the mechanism components; and
5) Information from at least one non-imaging sensor (e.g. pressure sensor, temperature sensor, acoustic sensor, motion sensors, etc.).

The additional health-related data is optionally used to evaluate the mechanism health, along with the image data. Alternately or additionally, the health-related data input from the non-imaging sensors is used to analyze the severity of an identified fault.

It is appreciated that monitoring health of the mechanism as described with respect to FIG. 10 may be combined in accordance with embodiments of the invention with any of the methods or processes described with respect to any of the chapters "Mode of failure identification" or "Monitoring and analysis of potential failures of a mechanism" hereinabove. For example, the fault may be identified using any of the change detection algorithms described with respect to FIG. 4 or 5 and/or a trend of a mode of failure may be analyzed using any of the processes described above.

Some embodiments may be performed according to the teachings of PCT Patent Application Publication WO 2022/162663, the contents of which are incorporated in their entirety by reference into the specification.

Optionally, the indicator includes maintenance instructions for at least one of the plurality of components of the mechanism. The maintenance instructions are based on image data compiled during multiple operations of the mechanism, and optionally other information (e.g., the time since the previous maintenance, the environmental conditions the mechanism has been working in, etc.). For example, the maintenance instructions may define the time and/or amount of use that is permitted before the mechanism is inspected and repaired if needed.

Optionally, the indicator includes a time of failure estimation (e.g. a trend of failure mode) for the mechanism and/or machine containing the mechanism. At the time of failure the mechanism (and possibly entire machine) becomes inoperable.

The time of failure estimation(s) may be performed by one or more of:
1) Machine learning of previous faults and/or failures;
2) Inputs from a manufacturer; and
3) Environmental parameters, such as one or more of the time of operation, area of operation, specific operator of the system, weather conditions, etc.

Optionally, the indicator includes a detected fault alert. A detected fault may require immediate action since the mechanism may operate incorrectly. For example, the indicator may alert that a landing should be aborted or a special way of operating the mechanism and/or machine until the fault is corrected. Further optionally, the indicator includes operating instructions in response to detected failure.

Optionally, when a fault is detected, the indicator includes the severity of the fault. For example, the larger the divergence of the actual reference point trajectories relative to the expected trajectories, the more severe the fault. Optionally or additionally, the severity of the fault is analyzed based on the health of components of the system. Optionally or additionally, the severity of the fault is analyzed based on environmental parameters within which the system is operating.

In some embodiments the mechanism is the subsystem of a vehicle. In further embodiments the subsystem is configured to support the body of the vehicle at least during the locked state.

Optionally, the mechanism is the landing gear of an aircraft or a spacecraft, and the method detects whether the landing gear is locked.

Optionally, the analyzing comprises estimating a degree of hardness of a landing of the aircraft from the relative motions of the reference points that were determined by image analysis, substantially as described above. The indicator may indicate the degree of hardness of the landing of the aircraft.

Optionally, at least one of the reference points is detected automatically when the model is trained and/or retrained.

Optionally, is specified by data input via a communication interface. Optionally, the reference point(s) are specified by a user through a GUI. Alternately or additionally, the reference point(s) are specified by an external mechanism and/or machine and/or system.

Optionally, the method further includes processing multiple images taken of the same mechanism component from different directions into a three-dimensional image of the mechanism component. The three-dimensional image is used as input to the model. Optionally, the three-dimensional image is output to a user for assessment.

Optionally, the analysis is further based on input from non-imaging sensors substantially as described above.

Optionally, the health of the mechanism is evaluated by selecting a particular reference point as a focal point which establishes a frame of reference for the entire mechanism. Relative motion of some or all of the other components is determined relative to the selected reference point. Thus, tracking a single reference point in the established frame of reference may be used to calculate the relative motion of the component the reference point is on.

In summary, some embodiments taught herein analyze images of components of a mechanism to obtain a large amount of information about the operation of the mechanism and the health of the mechanism. Reference points associated with the mechanism components are identified within the image data. The relative locations and/or motions of the reference points are analyzed, and an indicator is output with the results of the analysis. In some embodiments the indicator indicates a state of the mechanism, based at least on an analysis of the relative locations of reference points at a given time or time period. In some alternate or additional embodiments, the indicator includes information about the health of the mechanism, based at least on an analysis of the relative motions of the reference points.

Amongst other uses, the obtained information may be used to perform preventive maintenance on the mechanism in order to prevent mechanism faults or failures and/or to detect mechanism failures in real time so that immediate action may be taken.

It is expected that during the life of a patent maturing from this application many relevant mechanisms, machines, machine subsystems, optical sensors, cameras, models and modeling techniques and image analysis techniques will be developed and the scope of the terms mechanism, machine, subsystems, optical sensor, camera, model, reference point, identifying reference points, determining reference point alignment determining reference point trajectory and similar terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. For example, identifying a fault is described with respect to a plurality of embodiments of the invention. It is appreciated that faults, mode of failures and trends of modes of failures described in specific embodiments may be identified and analyzed as defined in other embodiments described herein. In addition, certain features such as analyzing touchdown, trends or health estimation are described with respect to specific embodiments and may also be provided with respect to other embodiments of the invention although not specifically mentioned with respect to these embodiments. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Unless otherwise defined, all technical and scientific terms used herein have the same meaning as commonly understood by one of ordinary skill in the art to which this disclosure pertains. In case of conflict, the patent specification, including definitions, will govern.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purposes and should not be regarded as limiting. Citation or identification of any reference in this application shall not be construed as an admission that such reference is available as prior art to the disclosure. To the extent that section headings are used, they should not be construed as necessarily limiting.

What is claimed is:

1. A system for monitoring health of a mechanism, the system comprising:
    one or more cameras located in positions having field of view to obtain a sequence of images including reference points of at least two of a plurality of components of said mechanism;
    a processing circuitry configured to execute the following instructions:
        determine, within the sequence of images received from said one or more cameras changes in positions of said reference points, to thereby identify relative motions of said reference points with each other over time;
        evaluate said health of said mechanism by comparing said relative motions to relative motions specified by a model of proper operation of said mechanism; and
        output an indicator of said health of said mechanism based on said evaluating.

2. The system of claim 1, wherein said indicator comprises at least one of:
    maintenance instructions;
    a time to failure estimation;
    a detected failure alert; and
    operating instructions in response to detected failure.

3. The system of claim 1, wherein at least two of said plurality of components comprise at least one component in rotational motion and at least one component in linear motion.

4. The system of claim 1, wherein said analyzing comprises determining an alignment of said reference points when said reference points are static, and said indicator indicates when said reference points are correctly aligned and incorrectly aligned relative to each other.

5. The system of claim 1, wherein said analyzing comprises comparing relative trajectories of said reference points to trajectories specified by said model, and said indicator comprises an alert when said relative trajectories are outside a tolerance of said model.

6. The system of claim 5, wherein said analyzing comprises estimating respective forces exerted on said at least two of said plurality of components during operation of said mechanism from said relative motions, and said indicator indicates said estimated levels of force.

7. The system of claim 1, wherein said processing circuitry is further configured to monitor at least one defect said plurality of components and said evaluating said health of said machine is further based on said monitoring of said at least one defect.

8. The system of claim 1, wherein said evaluating said health of said mechanism is further based on at least one of:
    a force exerted on at least one of said plurality of components;
    a defect in at least one of said plurality of components;
    a deformation of at least one of said plurality of components;
    a change in shape of at least one of said plurality of components; and
    information from at least one non-imaging sensor.

9. The system of claim 1, wherein said indicator comprises maintenance requirements for at least one of said plurality of components of said mechanism, said maintenance requirements being based on image data compiled during a plurality of operations of said mechanism.

10. The system of claim 1, wherein said mechanism comprises a subsystem of a vehicle, and wherein said subsystem is positioned between a body of said vehicle and a surface supporting said vehicle.

11. The system of claim 10, wherein said mechanism comprises a landing gear of an aircraft.

12. The system of claim 11, wherein said indicator indicates one of a locked and an unlocked state of said landing gear.

13. The system of claim 11, wherein said comparing comprises estimating a degree of hardness of a landing of said aircraft from said relative motions during touchdown, and said indicator indicates said degree of hardness of said landing of said aircraft.

14. The system of claim 1, wherein said model is trained using a training set of images collected during operation of said mechanism and/or a similar mechanism.

15. The system of claim 14, wherein at least one of said reference points is detected automatically as a result of said training of said model.

16. The system of claim 1, wherein at least one of said reference points is specified by a user.

17. The system of claim 1, wherein the at least one camera is fixed relative to the plurality of components of said mechanism.

18. A method for monitoring health of a mechanism, comprising:
    inputting image data of a plurality of components of said mechanism from at least one camera having field of view to obtain a sequence of images including reference points of at least two of a plurality of components of said mechanism;
    determining, within the sequence of images received from said one or more cameras changes in positions of said reference points, to thereby identify relative motions of said reference points with each other over time;
    evaluating said health of said mechanism by comparing said relative motions to relative motions specified by a model of proper operation of said mechanism; and
    outputting an indicator of said health of said mechanism based on said evaluating.

19. The method of claim 18, wherein said indicator comprises at least one of:
    maintenance instructions;
    a time to failure estimation;
    a detected failure alert; and
    operating instructions in response to detected failure.

20. The method of claim 18, wherein at least two of said plurality of components comprise at least one component in rotational motion and at least one component in linear motion.

21. The system of claim 13, wherein said relative motions during touchdown are indicative of a deformation of a component of said landing gear.

22. The system of claim 13, wherein said estimating is based on at least one of a change in the trajectories of the reference points over time and a change in the alignments of the reference points over time.

* * * * *